United States Patent [19]
Dave et al.

[11] Patent Number: 6,112,023
[45] Date of Patent: Aug. 29, 2000

[54] SCHEDULING-BASED HARDWARE-SOFTWARE CO-SYNTHESIS OF HETEROGENEOUS DISTRIBUTED EMBEDDED SYSTEMS

[75] Inventors: Bharat P. Dave, Howell; Niraj K. Jha; Ganesh Lakshminarayana, both of Princeton, all of N.J.

[73] Assignee: Lucent Technologies Inc., Murray Hill, N.J.

[21] Appl. No.: 09/024,604

[22] Filed: Feb. 17, 1998

Related U.S. Application Data

[60] Provisional application No. 60/038,934, Feb. 24, 1997, provisional application No. 60/038,488, Feb. 24, 1997, and provisional application No. 60/054,709, Aug. 4, 1997.

[51] Int. Cl.$^7$ .................................................... G06F 9/44
[52] U.S. Cl. ............................... 395/500.48; 395/500.17; 395/500.49; 395/653; 395/674; 395/675; 395/677; 395/800.16; 709/226
[58] Field of Search .................. 395/500.44, 500.48, 395/650, 670, 674, 676, 500.03, 406, 500.17, 500.49, 800.16, 651, 653, 675, 677; 709/203, 226

[56] References Cited

U.S. PATENT DOCUMENTS

| | | | |
|---|---|---|---|
| 4,885,684 | 12/1989 | Austin et al. | 364/300 |
| 5,202,987 | 4/1993 | Bayer et al. | 395/650 |
| 5,210,872 | 5/1993 | Ferguson et al. | 395/650 |
| 5,418,953 | 5/1995 | Hunt et al. | 395/650 |
| 5,452,461 | 9/1995 | Umekita et al. | 395/700 |
| 5,590,323 | 12/1996 | Kartalopoulos | 395/676 |
| 5,742,821 | 4/1998 | Prasanna | 395/672 |
| 5,768,594 | 6/1998 | Blelloch et al. | 395/706 |
| 5,781,787 | 7/1998 | Shafer et al. | 395/800 |
| 5,870,588 | 2/1999 | Rompaey et al. | 395/500 |

OTHER PUBLICATIONS

"A Global Criticality/Local Phase Driven Algorithm for the Constrained Hardware/Software Partitioning Problem", by Asawaree Kalavade and Edward A. Lee; 1994 IEEE, pp. 42–48.

"Algorithms for Scheduling Hard Aperiodic Tasks in Fixed–Priority Systems using Slack Stealing", by Sandra R. Thuel and John P. Lehoczky, 1994 IEEE, pp. 22–33.

"Allocation of Periodic Task Modules with Precedence and Deadline Constraints in Distributed Real–Time Systems", by Chao–Ju Hou and Kang G. Shin, 1992 IEEE Computer Society Technical Committee on Real–Time Systems, 11 pages.

(List continued on next page.)

*Primary Examiner*—Kevin J. Teska
*Assistant Examiner*—Thai Phan

[57] ABSTRACT

Hardware-software co-synthesis is the process of partitioning an embedded system specification into hardware and software modules to meet performance, power, and cost goals. Embedded systems are generally specified in terms of a set of acyclic task graphs. According to one embodiment of the present invention, a co-synthesis algorithm, called COSYN, starts with periodic task graphs with real-time constraints and produces a low-cost heterogeneous distributed embedded system architecture meeting these constraints. The algorithm has the following features: 1) it allows the use of multiple types of processing elements (PEs) and inter-PE communication links, where the links can take various forms (point-to-point, bus, local area network, etc.), 2) it supports both concurrent and sequential modes of communication and computation, 3) it employs a combination of preemptive and non-preemptive scheduling, 4) it introduces the concept of an association array to tackle the problem of multi-rate systems (which are commonly found in multimedia applications), 5) it uses a static scheduler based on deadline-based priority levels for accurate performance estimation of a co-synthesis solution, 6) it uses a new task clustering technique which takes the changing nature of the critical path in the task graph into account, 7) it supports pipelining of task graphs to derive a cost-efficient architecture, 8) it supports a mix of various technologies, such as 5 V CMOS, 3.3 V CMOS, 2.7 V CMOS, ECL, etc., to meet embedded system constraints and minimize power dissipation, and 9) if desired, it also optimizes the architecture for power consumption.

38 Claims, 21 Drawing Sheets

OTHER PUBLICATIONS

"An Efficient Algorithm for Graph Isomorphism", by D.G. Corneil and C.C. Gotlieb, Journal of the Association for Computing Machinery, vol. 17, No. 1, Jan. 1970, pp. 51–64.

"An Optimal Algorithm for Scheduling Soft–Aperiodic Tasks in Fixed–Priority Preemptive Systems", by John P. Lehoczky and Sandra Ramos–Thuel, 1992 IEEE Computer Society Technical Committee on Real–Time Systems, 15 pages.

"Aperiodic Servers in a Deadline Scheduling Environment", by T.M. Ghazalie and T.P. Baker; Realtime Systems 9, (1995), pp. 31–67.

"Architectural Support For Designing Fault–Tolerant Open Distributed Systems", by Salim Hariri, Alok Choudhary, and Behcet Sarikaya, 1992 IEEE.

"Calculating the Maximum Execution Time of Real–Time Programs", by P. Puschner and C.H. Koza, The Journal of Real–Time Systems, 1,(1989), pp. 159–176.

"Communication Synthesis for Distributed Embedded Systems", by Ti–Yen Yen and Wayne Wolf, Proceedings of International Conference on Computer–Aided Design, pp. 288–294, Nov. 1995.

"Computer–Aided Hardware–Software Codesign", by Giovanni De Micheli, Aug. 1994 IEEE Micro Chips, Systems, Software, and Applications, 8 pages.

"Configuration–Level Hardware/Software Partitioning for Real–Time Embedded Systems", by Joseph G. D'Ambrosio and Xiaobo (Sharon) Hu, 1994 IEEE, pp. 34–41.

"Constrained Software Generation for Hardware–Software Systems", by Rajesh K. Gupta and Giovanni De Micheli, 1994 IEEE, pp. 56–63.

"Dynamic Critical–Path Scheduling: An Effective Technique for Allocating Task Graphs to Multiprocessors", by Yu–Kwong Kwok, Ishfaq Ahmad, IEEE Transactions on Parallel and Distributed Systems, vol. 7, No. 5, May 1996, 17 pages.

"Efficient Scheduling Algorithms for Real–Time Multiprocessor Systems", by Krithi Ramamritham, John A. Stankovic, and Perng–Fei Shiah, IEEE Transactions on Parallel and Distributed, vol. 1, No. 2, Apr. 1990, 12 pages.

"Exploiting Unused Periodic Time for Aperiodic Service Using the Extended Priority Exchange Algorithm", by Brinkley Sprunt, John Lehoczky, and Lui Sha, IEEE Computer Society Real–Time Systems Symposium, Dec. 6–8, 1988, pp. 251–258.

"Hardware–Software Co–Design of Embedded Systems", by Wayne H. Wolf, Proceedings of the IEEE, vol. 82, No. 8, Jul. 1994, pp. 967–989.

"A Hardware–Software Codesign Methodology for DSP Applications", by Asawaree Kalavade and Edward A. Lee, Sep. 1993 IEEE Design & Test of Computers, pp. 16–28.

"Hardware–Software Cosynthesis for Digital Systems", by Rajesh K. Gupta and Giovanni De Micheli, Sep. 1993, IEEE Design & Test of Computers, pp. 29–40.

A Hardware/Software Partitioner Using a Dynamically Determined Granularity, by Jörg Henkel and Rolf Ernst, DAC 97–6/97 Anaheim, CA, 3 pages.

"Hill–Climbing Heuristics for Optical Hardware Dimensioning and Software Allocation in Fault–Tolerant Distributed Systems", by Fausto Distant and Vincenzo Piuri, IEEE Transactions on Reliability, vol. 38, No. 1, Apr., 1989, pp. 28–39.

"Load Sharing with Consideration of Future Task Arrivals in Heterogeneous Distributed Real–Time Systems", by Chao–Ju Hou and Kang G. Shin, 1991 IEEE Real–Time Computer Laboratory, pp. 94–103.

"Low Overhead Fault Tolerance for Real–Time Distributed Systems: Application to Hardware/Software Co–Synthesis of Embedded Systems", by Santhanam Srinivasan and Niraj K. Jha, 31 pages, corresponding to conference paper presented Sep. 1995 in Proc. European Design Automation Conf.

"On–Line Scheduling of Hard Deadline Aperiodic Tasks in Fixed–Priority Systems", by Sandra Ramos–Thuel and John P. Lehoczky, 1993 IEEE, pp. 160–171.

"On–Line Scheduling of Real–Time Tasks", by Kwang S. Hong and Joseph Y.–T. Leung, 1988 IEEE Computer Society, pp. 244–250.

On the Complexity of Fixed–Priority Scheduling of Periodic, Real–Time Tasks, by Joseph Y.–T. Leung and Jennifer Whitehead, 1982 North–Holland Publishing Company, Performance Evaluation 2 (1982), pp. 237–250.

"On Non–Preemptive Scheduling of Periodic and Sporadic Tasks", by Kevin Jeffay, Donald F. Stanat, and Charles U. Martel, Dec. 1991 IEEE Twelfth Real–Time Systems Symposium, pp. 129–139.

Optimal Algorithms for Synthesis of Reliable Application–Specific Heterogeneous Multiprocessors, by Aurobindo Dasgupta and Ramesh Karri, IEEE Transactions on Reliability, vol. 44, No. 4, Dec., 1995, pp. 603–613.

"Optimal Priority Assignment for Aperiodic Tasks With Firm Deadlines in Fixed Priority Pre–Emptive Systems", by Robert Davis and Alan Burns, Information Processing Letters, vol. 53, No. 5, Mar. 1995, pp. 249–254.

"Performance Estimation for Real–Time Distributed Embedded Systems", by Ti–Yen Yen and Wayne Wolf, Dept. of Electrical Engineering, Princeton University, pp. 1–6, Proc. of Intl. Conf. on Computer Design, Oct. 1995.

"Process Partitioning for Distributed Embedded Systems", by Junwei Hou and Wayne Wolf, Sep. 1996 IEEE, pp. 70–75.

"Program Implementation Schemes for Hardware–Software Systems", by Rajesh K. Gupta, Claudionor N. Coelho Jr., and Giovanni De Micheli, Jan. 1994 IEEE, vol. 27, No. 1, pp. 48–55.

"Rate–Monotonic Analysis for Real–Time Industrial Computing", by Mark H. Klein et al., Jan. 1994, vol. 27, No. 1, pp. 24–33.

"Replication and Allocation of Task Modules in Distributed Real–Time Systems", by Chao–Ju Hou and Kang G. Shin, Jun. 1994, IEEE Computer Society, pp. 26–35.

"Scheduling Algorithms and Operating Systems Support for Real–Time Systems", by Krithi Ramamritham and John A. Stankovic, Proceedings of the IEEE, vol. 82, No. 1, Jan. 1994, pp. 55–67.

"Scheduling Parallel I/O Operations in Multiple Bus Systems", by Ravi Jain et al., Journal of Parallel and Distributed Computing 16, 1992, pp. 352–362.

"Scheduling Periodically Occurring Tasks on Multiple Processors", by Eugene L. Lawler and Charles U. Martel, Information Processing Letters, vol. 12, No. 1, Feb. 1981.

"Scheduling Slack Time in Fixed Priority Pre–emptive Systems", by R.I. Davis, K.W. Tindell, and A. Burns, Dec. 1993 IEEE Real–Time Systems Symposium, pp. 222–231.

"Scheduling Tasks with Resource Requirements in Hard Real–Time Systems", by Wei Zhao et al., IEEE Transactions on Software Engineering, vol. SE–13, No. 5, May 1987, pp. 564–577.

"Sensitivity–Driven Co–Synthesis of Distributed Embedded Systems", by Ti–Yen Yen and Wayne Wolf, International Symposium on System Synthesis, 1995, pp. 1–6.

"SIERA: A Unified Framework for Rapid–Prototyping of System–Level Hardware and Software", by Mani B. Srivastava and Robert W. Brodersen, IEEE Transactions on Computer–Aided Design of Integrated Circuits and Systems, vol. 14, No. 6, Jun. 1995, pp. 676–693.

"SOS: Synthesis of Application–Specific Heterogeneous Multiprocessor Systems", by Shiv Prakash and Alice C. Parker, Journal of Parallel and Distributed Computing, vol. 16, No. 4, pp. 338–351 (1992).

"SpecCharts: A VHDL Front–End for Embedded Systems", by Frank Vahid, Sanjiv Narayan, and Daniel D. Gajski, IEEE Transactions on Computer–Aided Design of Integrated Circuits and Systems, vol. 14, No. 6, Jun. 1995, pp. 694–706.

"Synthesis of Application Specific Instruction Sets", Ing–Jer Huang and Alvin M. Despain, IEEE Transactions of Computer–Aided Design of Integrated Circuits and Systems, vol. 14, No. 6, Jun. 1995, pp. 663–675.

"System–Level Synthesis of Low–Power Hard Real–Time Systems", by Darko Kirovski and Miodrag Potkonjak, DAC97, 6/97, Anaheim, CA, 6 pages.

"Task Allocation for Maximizing Reliability of Distributed Computer Systems", by Sol M. Shatz, Jia–Ping Wang, and Masanori Goto, IEEE Transactions on Computers, vol. 41, No. 9, Sep. 1992, pp. 1156–1160.

"TBFT: A Task–Based Fault Tolerance Scheme for Distributed Systems", by Shalini Yajnik, Santhanam Srinivasan, Niraj K. Jha, Seventh International Conference on Parallel and Distributed Computing Systems, Oct. 1994, 21 pages.

"TigerSwitch: A Case Study in Embedded Computing System Design", by Wayne Wolf, Andrew Wolfe, Steve Chinatti, Ravi Koshy, Gary Slater, and Spencer Sun, 0–8186–6315–4/94, 1994 IEEE, pp. 89–96.

"An Approach to the Adaption of Estimated Cost Parmeters in the COSYMA Systems," by D. Hermann et al., Proceedings of the Third International Workshop on Hardware/Software CoDesign, 1994, pp. 100–107.

"Architectual Partitioniong for Systems Level Synthesis of Integrated Circuits," by E. Lagnes et al., IEEE Computer Aided Design of Integrated Circuits and Systems, 1991, pp. 847–860.

"CoWare–A Design Environment for Hetergenous Hardware/Software Systems," by Van Rompaey et al., Design Automation Conference, 1996, pp. 252–257.

"Fast Timing Analysis for Hardware–Software Co–Synthesis,"by R. Ernst et al., VLSI in Computes and Processors, 1993, pp. 452–457.

"Hardware–Software Cosynthesis for Microcontrollers," by. R. Ernst et al., IEEE Design & Test of Computers, Dec. 1993, pp. 64–75.

"Synthesis and Anaylsis of an Industrial Embedded Microcontroller," by Ing–Jer Huang et al., Design Automation Conference, 1997, pp. 151–156.

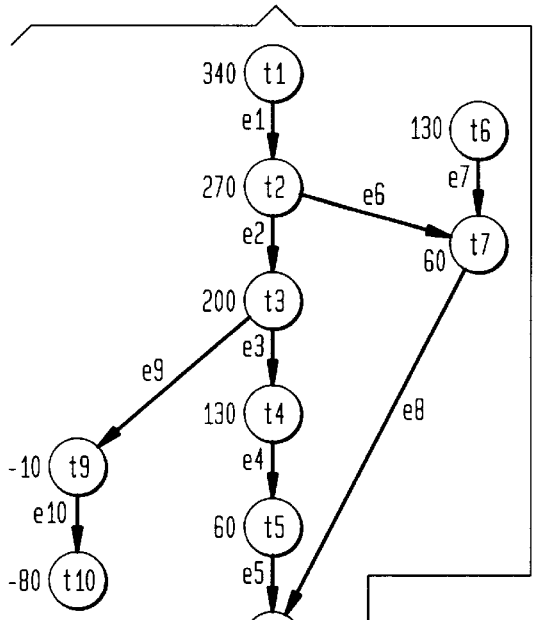
FIG. 1A
EST=0
Period=150
Deadline (t10)=100
Deadline (t11)=100
FIG. 1B
PE library:
Cost of PE[PE1,PE2]=[120,70]
Link library:
Cost of link [L1,L2]=[35,20]
FIG. 1C
Execution_vector of each task=[10,20]
Communication_vector of each edge=[30,50]
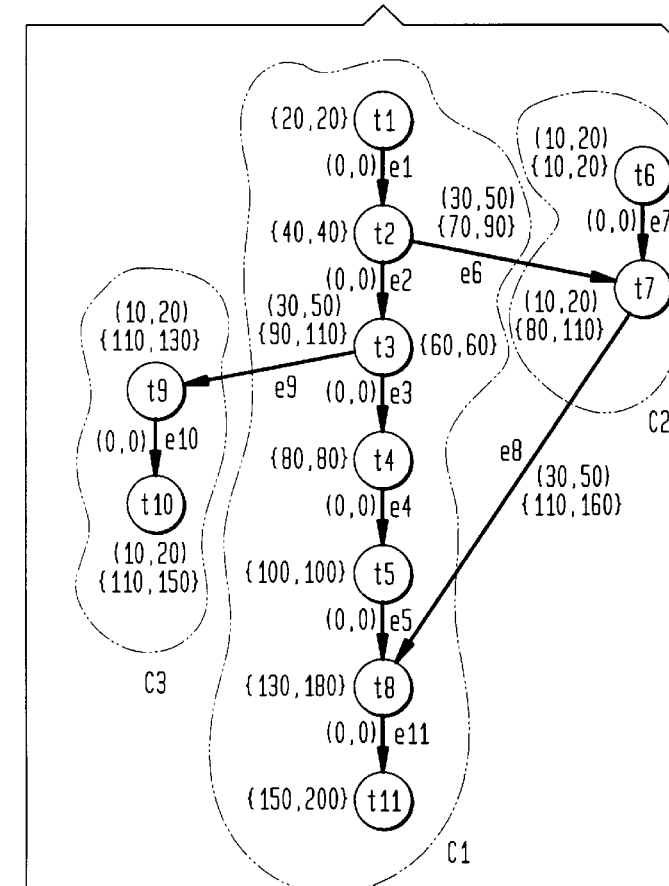
FIG. 1D
(a,b): EXECUTION/COMMUNICATION VECTOR
{c,d}: FINISH TIME ESTIMATE

TASK GRAPH T1

TASK GRAPH T2

TASK GRAPH T3

FIG. 4

```
COSYN(task graphs, resource library, constraints){
  assign deadline-based priority levels(task graph);
  FORM_ASSOCIATION_ARRAY(task_graphs);
  cluster_list ← FORM_CURRENT_CRITICAL_PATH_BASED_CLUSTERS(task graphs);
  sorted_cluster_list ← sort clusters in the order of decreasing priority levels;
  for each cluster in sorted_cluster_list{
    cluster_tag=UNALLOCATED;}
  partial_architecture=NULL;
  ALLOCATE_CLUSTERS(sorted_cluster_list,partial_architecture){
  for each unallocated cluster $C_i$ from sorted_cluster_list{
    allocation array ← FORM_ALLOCATION_ARRAY($C_i$, partial_architecture);
    for each allocation in allocation array{
      schedule allocated clusters;
      performance evaluation;|| performs finish time, energy, and power estimation
      if(deadline met in best case){
        partial_architecture=current_allocation;
        break;}
      else{
        partial_architecture=best allocation;}
    }
    cluster_tag($C_i$)=ALLOCATED;}
  }
  return final_solution=partial_architecture;
}
```

FIG. 5

```
FORM_ASSOCIATION_ARRAY(task graphs){
    for each task graph Ti{
        ||Each task graph has a deadline equal to the maximum of all specified deadlines in it
        if(period<deadline){
            Ti_depth=⌈(Ti_deadline÷Ti_period)⌉
            Ti_modified_period=Ti_depth·Ti_period;}
        else{
            Ti_depth=1;
            Ti_modified_period=Ti_period;}
    }
    hyperperiod ← LCM of modified_periods of all task graphs
    for each task graph Ti{
        Ti_length=hyperperiod÷modified_period;}
    for each task tj{
        create an association array of dimensions (tj_task_graph_length,tj_task_graph_depth);
        INITIALIZE_ASSOCIATION_ARRAY(task tj);}
}

INITIALIZE_ASSOCIATION_ARRAY(task tj){
    Tk=tj_task graph;
    for i=1 to Tk_depth{
        for j=1 to Tk_length{
            EST(i,j)=Tk_EST+((i-1)·Tk_period)+((j-1)·Tk_modified_period);
            deadline(i,j)=EST(i,j)+Tk_deadline;
            ||start and finish times are updated by the scheduling and finish time estimation procedures.
            best_case_start(i,j)=-∞;worst_case_start(i,j)=-∞;
            best_case_finish(i,j)=-∞;worst_case_finish(i,j)=-∞;}
    }
}
```

FIG. 6A
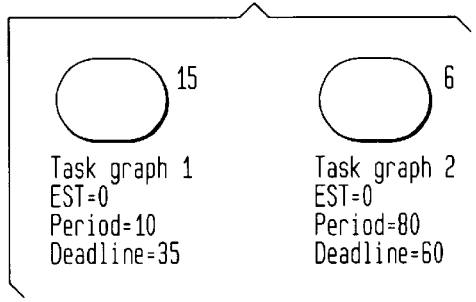
Task graph 1
EST=0
Period=10
Deadline=35
Task graph 2
EST=0
Period=80
Deadline=60
FIG. 6C
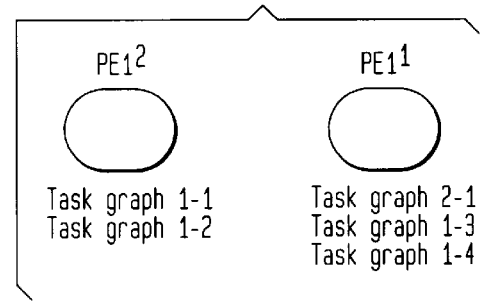
$PE1^2$
Task graph 1-1
Task graph 1-2
$PE1^1$
Task graph 2-1
Task graph 1-3
Task graph 1-4
FIG. 6B
| Task | [PE instance, EST, deadline, priority level, best-case PFT, worst-case PFT] | |
|---|---|---|
| | Copy 1 | Copy 2 |
| Task graph 1-1 | [$PE1^1$,0,35,-20,15,15] | [$PE1^1$,40,75,-60,55,55] |
| Task graph 1-2 | [$PE1^1$,10,45,-30,30,30] | [$PE1^1$,50,85,-70,70,70] |
| Task graph 1-3 | [$PE1^2$,20,55,-40,35,35] | [$PE1^2$,60,95,-80,75,75] |
| Task graph 1-4 | [$PE1^2$,30,65,-50,50,50] | [$PE1^2$,70,105,-90,90,90] |
| Task graph 2-1 | [$PE1^2$,0,60,-54,16,16] | NOT APPLICABLE |
FIG. 7A
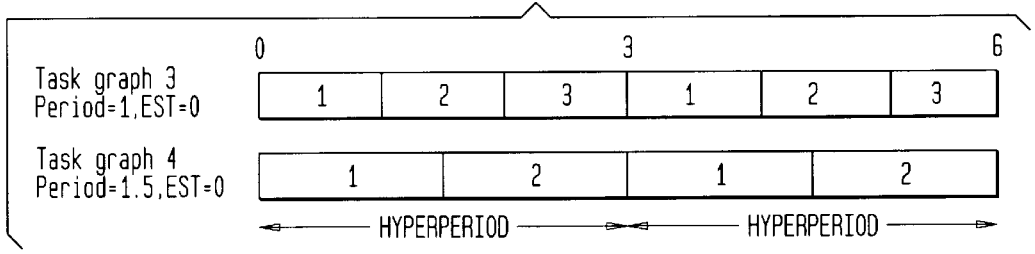
FIG. 7B
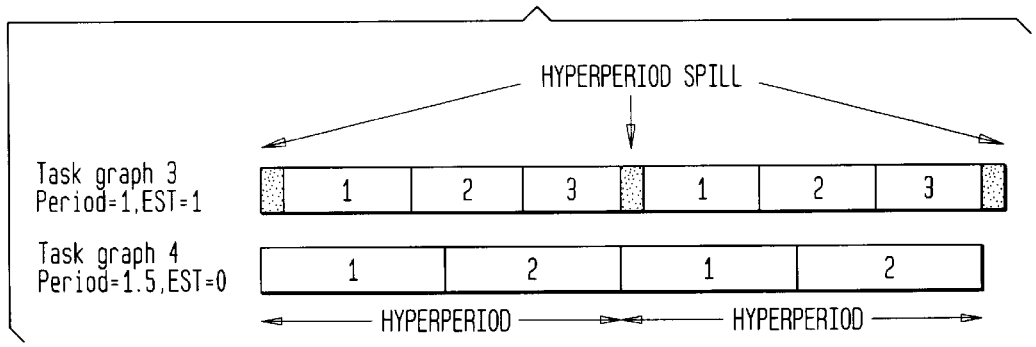

FIG. 9

```
FORM_CURRENT_CRITICAL_PATH_BASED_CLUSTERS(task graphs){
  sorted_list ← sort tasks by decreasing priority levels;
  threshold=hyperperiod;
  for each task ti{
    ti_tag=NOT_CLUSTERED;}
  cluster_list ← NULL;
  for each unclustered task ti from sorted_list{
    fan-in-set(ti)=NULL;
    for each fan-in task tj{
      if(tj is not already clustered with another fanout task and its cluster is compatable with ti){
        if(size(cluster(tj)U ti)≤hyperperiod){
          fan-in-set(ti)=fan-in-set(ti)+tj;}}
      if(fan-in-set(ti)=NULL){
        allocate a new cluster Cj;
        cluster_list ← cluster_list U (Cj);
        CLUSTER_GROWTH(Cj,ti);}
      else{
        tk ← a task from fan-in-set(ti) with highest priority level along task ti;
        Cj=cluster(tk);
        β(tk,ti)=0;
        CLUSTER_GROWTH(Cj,ti);}
    sorted_list ← sort tasks by decreasing priority levels;
  }
  return cluster_list;
}
```

FIG. 10

```
CLUSTER_GROWTH(Cluster Ck,task tj){
  tk=last task of cluster Ck;
  Ck=Ck U (tj);          // add task tj to cluster Ck
  //update preference and exclusion vectors of cluster Ck
  preference_vector(Ck)=preference_vector(Ck) AND preference_vector(tj);
  exclusion_vector(Ck)=exclusion_vector(Ck) OR exclusion_vector(tj);
  tj_tag=CLUSTERED;
  if(Ck has more than one task){
    assign priority levels (tj_task_graph);}
  if(size of cluster Ck is < hyperperiod){
    find the fan-out-set of tj among its unclustered fanout tasks
    which are compatible with cluster Ck;
    if(fan-out-set is not empty){
      eligible_fan_out_task tm ←— a task from the fan-out-set along the edge from tj to
                                    which the priority level of tj is the highest and the size of (Ck U tm) is < hyperperiod;}
    if(tm exists){
      β(tj,tm)=0;
      Ck=CkU{tm};          // add task tm to cluster Ck
      //update preference and exclusion vectors of cluster Ck
      preference_vector(Ck)=preference_vector(Ck)AND preference_vector(tm);
      exclusion_vector(Ck)=exclusion_vector(Ck) OR exclusion_vector(tm);
      tm_tag=CLUSTERED;
      assign priority levels(tj_task graph);}
  }
  return cluster_list;
}
```

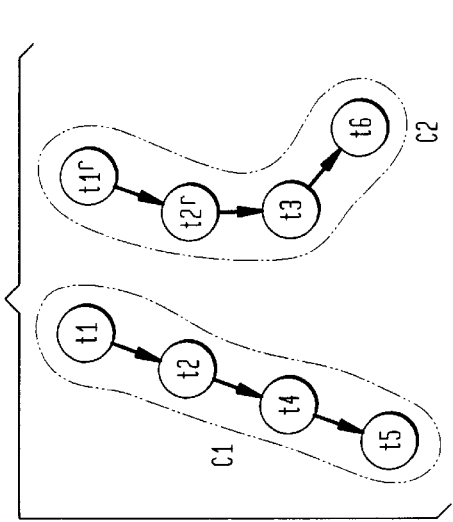

FIG. 12A

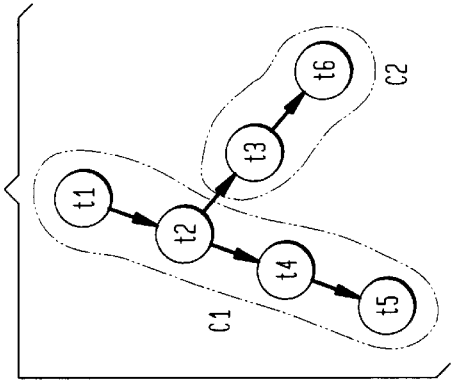

FIG. 12B

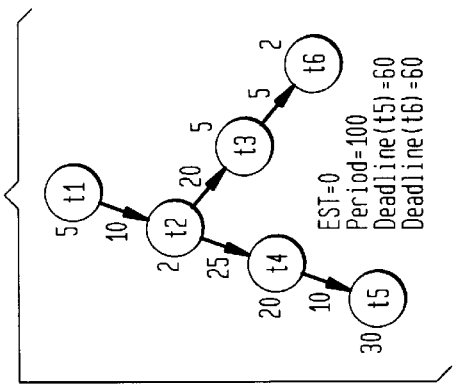

FIG. 12C

```
FORM_ALLOCATION_ARRAY(cluster Ci,partial architecture){
    form allocation array considering the following:
    1) addition of architectural templates based on architectural hints
    2) preference vector
    3) existing partial architecture
    4) upgrade of existing links
    5) upgrade of existing PEs
    6) addition of new PEs of each type
    7) addition of new links of each type to each PE
    for each allocation(
        for each PE and link{
            if(gate count,power,pin count,memory limits,or communication port count etc. are exceeded){
                remove allocation from the allocation array;
                break;}
    }
    Order allocations in the order of increasing dollar cost;
    return allocation array;
}
```

```
SCHEDULE(current_architecture,task graphs,association array){
    assign deadline-based priority levels to tasks and edges;
    initialize the association array;
    for each task t_i which does not start at EST=0{
        identify the jth copy of (t_i,t_j) which requires a hyperperiod spill;
        t_j_priority=t_j_priority+hyperperiod;}
    task_list ← order tasks in the order of decreasing priority levels;
    for each t_k of task_list{
        t_k_tag=unscheduled;}
    for each unscheduled task t_l from task_list{
        schedule all incoming edges of t_l;|| schedules fan-in tasks, if they are not already scheduled
        schedule first copy of t_l and the required hyperperiod spill;
        update association array for the remaining copies and,if necessary,schedule remaining copies;
        if(t_l is not schedulable){
            return failure;
            break;||reject the current architecture;}
        t_l_tag=scheduled;
    }
    return success;
}
```

FIG. 16A

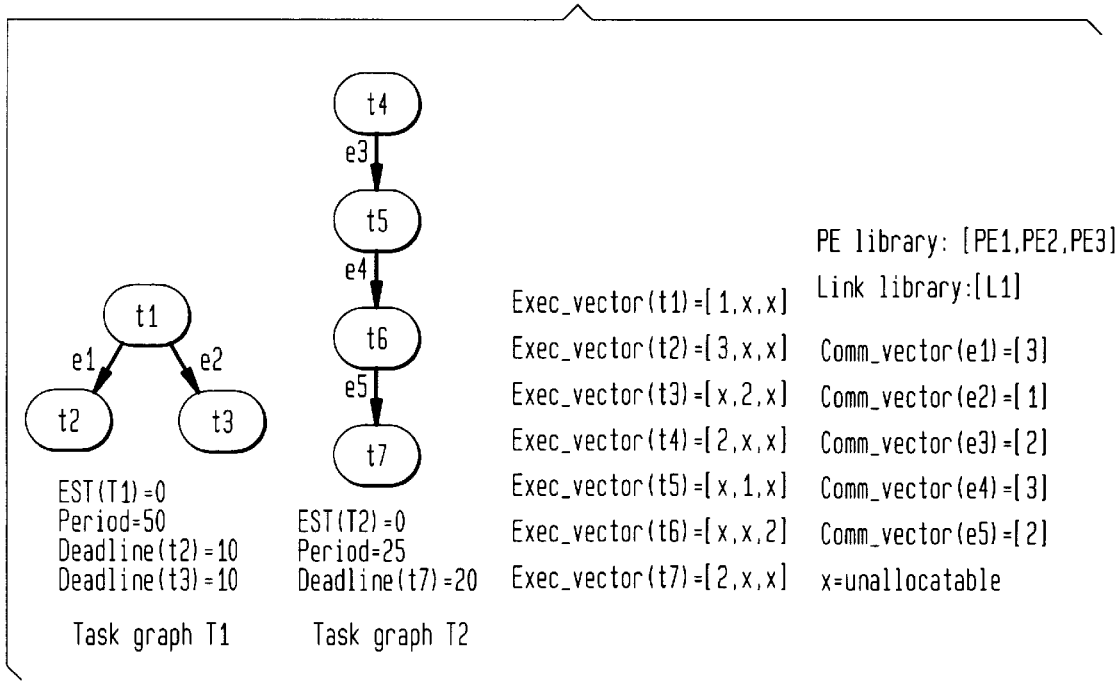

Exec_vector(t1)=[1,x,x]
Exec_vector(t2)=[3,x,x]
Exec_vector(t3)=[x,2,x]
Exec_vector(t4)=[2,x,x]
Exec_vector(t5)=[x,1,x]
Exec_vector(t6)=[x,x,2]
Exec_vector(t7)=[2,x,x]

PE library: [PE1,PE2,PE3]
Link library:[L1]

Comm_vector(e1)=[3]
Comm_vector(e2)=[1]
Comm_vector(e3)=[2]
Comm_vector(e4)=[3]
Comm_vector(e5)=[2]
x=unallocatable EST(T1)=0
Period=50
Deadline(t2)=10
Deadline(t3)=10

EST(T2)=0
Period=25
Deadline(t7)=20

Task graph T1    Task graph T2

FIG. 16B

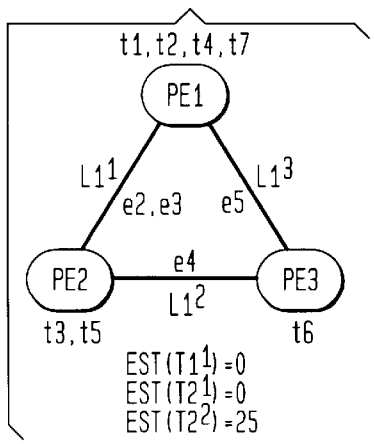

$EST(T1^1)=0$
$EST(T2^1)=0$
$EST(T2^2)=25$

FIG. 16C

| PE1 | {t1,0,1},{t2,1,4},{t4¹,4,6},{t7¹,16,18},{t4²,29,31},{t7²,41,43} |
|---|---|
| L1¹ | {e2,4,5},{e3¹,6,8},{e3²,31,33} |
| PE2 | {t3,5,7},{t5¹,6,8},{t5²,33,34} |
| L1² | {e4¹,9,12},{e4²,34,37} |
| PE3 | {t6¹,12,14},{t6²,37,39} |
| L1³ | {e5¹,14,16},{e5²,39,41} |

Exec_slot={task(edge),start_time,finish_time}

FIG. 17A
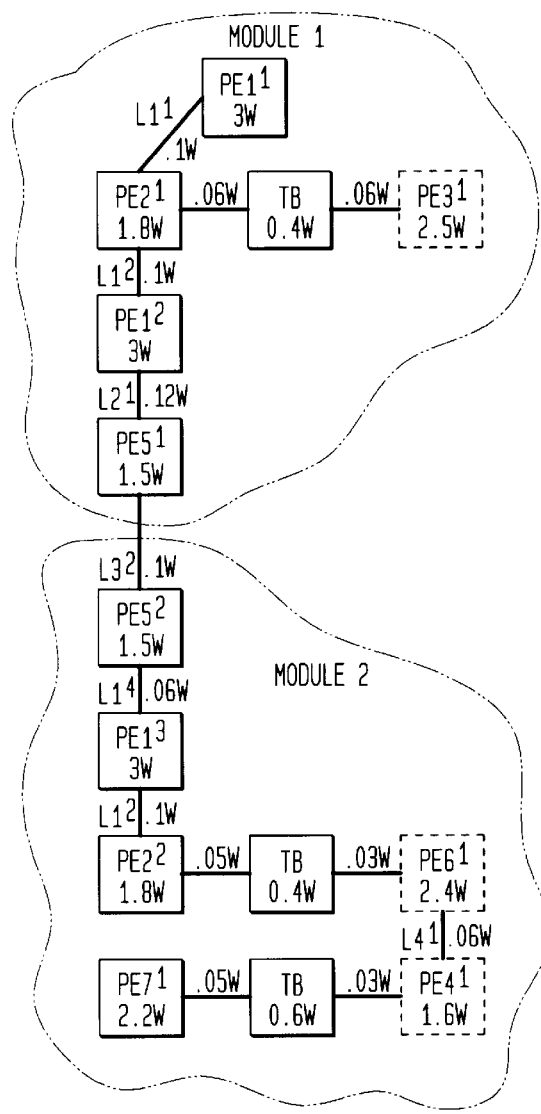
FIG. 17B
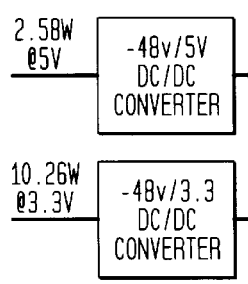 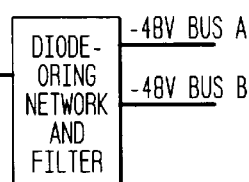
FIG. 17C
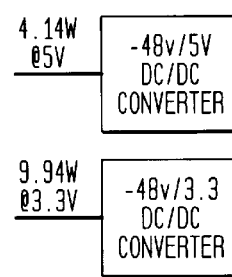 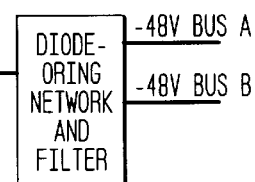

PE2(C1)
Cost=70
PFT={150,200}
UPGRADE

PE1(C1)
Cost=120
PFT={110,160}
BRING IN NEW CLUSTER

PE1(C1,C2)
Cost=120
PFT={90,120}
BRING IN NEW CLUSTER

PE1(C1,C2,C3)
Cost=120
PFT={110,110}
UPGRADE

PE1(C1,C2)  L2  PE2(C3)
Cost=120
PFT={120,120}
UPGRADE

PE1(C1,C2)  L1  PE2(C3)
Cost=225
PFT={100,100}
SUCCESS! DEADLINE MET

FIG. 19A
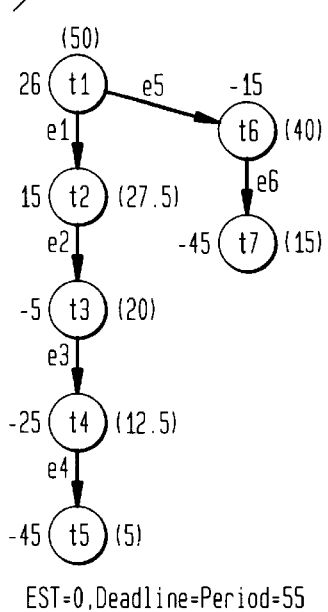
EST=0, Deadline=Period=55
FIG. 19B
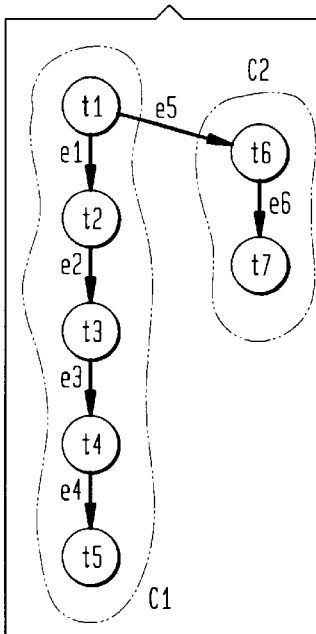
FIG. 19D
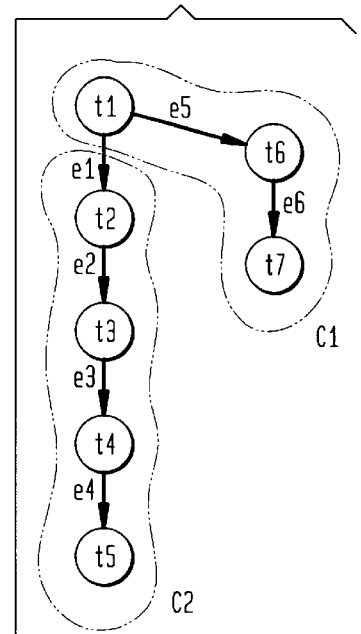
FIG. 19C
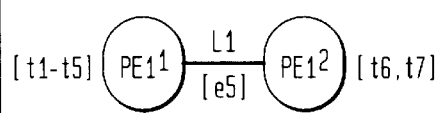
Finish time of task t5=50
Finish time of task t7=40
Total energy=60
Cost[PE1,L1]=[100,20]
FIG. 19E
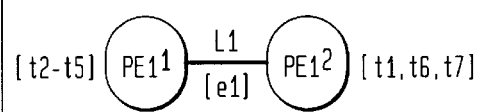
Finish time of task t5=51
Finish time of task t7=30
Total energy=55.25
FIG. 19F
| TASK | t1 | t2 | t3 | t4 | t5 | t6 | t7 |
|---|---|---|---|---|---|---|---|
| AVERAGE POWER DISSIPATION | 0.50 | 0.50 | 0.50 | 0.50 | 0.50 | 1.50 | 1.50 |
| MAXIMUM EXECUTION TIME | 10 | 10 | 10 | 10 | 10 | 10 | 10 |
| EDGE | e1 | e2 | e3 | e4 | e5 | e6 |
|---|---|---|---|---|---|---|
| AVERAGE POWER DISSIPATION | 0.25 | 0.25 | 0.25 | 0.25 | 0.50 | 0.50 |
| MAXIMUM COMMUNICATION TIME | 1 | 10 | 10 | 10 | 10 | 20 |

TABLE 1: EXAMPLE CHARACTERISTICS

| EXAMPLE | PROBLEM SIZE | | | |
|---|---|---|---|---|
| | NUMBER OF OF TASK GRAPHS | NUMBER OF TASKS | NUMBER OF PE TYPES IN THE LIBRARY | NUMBER OF LINKS IN THE LIBRARY |
| PRAKASH & PARKER (0) | 1 | 4 | 3 | 1 |
| PRAKASH & PARKER (1) | 1 | 9 | 3 | 1 |
| PRAKASH & PARKER (2) | 1 | 9 | 3 | 1 |
| PRAKASH & PARKER (3) | 1 | 9 | 3 | 1 |
| PRAKASH & PARKER (4) | 2 | 13 | 3 | 1 |
| YEN & WOLF EX | 2 | 6 | 3 | 2 |
| HOU & WOLF EX1 | 2 | 20 | 3 | 1 |
| HOU & WOLF EX2 | 2 | 20 | 3 | 1 |
| DSP | 1 | 119 | 7 | 2 |
| TRANSPORT SYSTEMS | 1-15 | 15-1072 | 19 | 5 |

TABLE 2: EXPERIMENTAL RESULTS FOR TASK GRAPHS FROM THE LITERATURE

| EXAMPLE/NO. OF TASKS | NUMBER OF PEs/LINKS | | | COST($) | | | CPU TIME (SEC) | | |
|---|---|---|---|---|---|---|---|---|---|
| | PRAKASH & PARKER | YEN/ HOU & WOLF | COSYN | PRAKASH & PARKER | YEN/ HOU & WOLF | COSYN | PRAKASH & PARKER ON SOL- BOURNE 5/e/900 | YEN/ HOU & WOLF ON SPARC 20 | COSYN ON SPARC 20 |
| PRAKASH & PARKER (0)/4 | 1/0 | - | 1/0 | 5 | - | 5 | 37.0 | - | 0.20 |
| PRAKASH & PARKER (1)/9 | 1/0 | 1/0 | 1/0 | 5 | 5 | 5 | 3691.2 | 59.2 | 0.40 |
| PRAKASH & PARKER (2)/9 | 2/1 | 3/1 | 2/1 | 10 | 10 | 10 | 7.4hrs | 56.8 | 0.54 |
| PRAKASH & PARKER (3)/9 | - | 3/1 | 2/1 | - | 12 | 10 | - | 193.3 | 0.58 |
| PRAKASH & PARKER (4)/13 | 1/1 | - | 1/1 | 5 | - | 5 | 106.7hrs | - | 0.84 |
| YEN & WOLF EX/6 | - | 3/2 | 3/2 | - | 1765 | 1765 | - | 10.6 | 0.74 |
| HOU & WOLF EX1/20 | - | 2/1 | 2/1 | - | 170 | 170 | - | 14.9 | 5.10 |
| HOU & WOLF EX2/20 | - | 2/1 | 2/1 | - | 170 | 170 | - | 4.96 | 2.64 |
| DSP/119 | - | - | 2/1 | - | - | 100 | - | - | 127.30 |

TABLE 3: EFFICACY OF THE ASSOCIATION ARRAY CONCEPT

| EXAMPLE/ NO. OF TASKS | COSYN WITHOUT ASSOCIATION ARRAY | | | | COSYN WITH ASSOCIATION ARRAY | | | |
|---|---|---|---|---|---|---|---|---|
| | NO. OF PEs/ LINKS | COST($) | CPU TIME (SEC) | AVERAGE POWER DISSIPATION (WATTS) | NO. OF PEs/ LINKS | COST($) | CPU TIME (SEC) | AVERAGE POWER DISSIPATION (WATTS) |
| BETS1/15 | 2/1 | 305 | 1.61 | 4.18 | 2/1 | 305 | 0.54 | 4.43 |
| BETS2/45 | 4/3 | 455 | 3.46 | 7.10 | 4/3 | 455 | 1.42 | 7.72 |
| BETS3/156 | 13/11 | 1725 | 1515.32 | 25.85 | 13/11 | 1725 | 118.40 | 26.40 |
| BCS/318 | 16/8 | 19550 | 8829.91 | 189.80 | 18/7 | 19800 | 910.50 | 198.40 |
| ATMIF/512 | 22/7 | 11610 | 10503.56 | 195.40 | 24/7 | 11800 | 1419.40 | 214.60 |
| BATIF1/728 | 26/11 | 14080 | 33221.19 | 232.60 | 28/11 | 14214 | 3942.70 | 238.24 |
| BATIF2/845 | 32/11 | 15800 | 72557.46 | 299.85 | 35/12 | 16088 | 10418.64 | 307.10 |
| OASIF/1072 | 43/15 | 26895 | 78248.30 | 364.30 | 44/16 | 27145 | 16864.70 | 381.70 |

TABLE 4: EFFICACY OF TASK CLUSTERING

| EXAMPLE/ NO. OF TASKS | COSYN WITHOUT CLUSTERING | | | | COSYN WITH CLUSTERING | | | |
|---|---|---|---|---|---|---|---|---|
| | NO. OF PEs/ LINKS | COST($) | CPU TIME (SEC) | AVERAGE POWER DISSIPATION (WATTS) | NO. OF PEs/ LINKS | COST($) | CPU TIME (SEC) | AVERAGE POWER DISSIPATION (WATTS) |
| BETS1/15 | 2/1 | 305 | 2.81 | 4.25 | 2/1 | 305 | 0.54 | 4.43 |
| BETS2/45 | 4/3 | 455 | 3.57 | 7.45 | 4/3 | 455 | 1.42 | 7.72 |
| BETS3/156 | 13/11 | 1725 | 374.60 | 24.95 | 13/11 | 1725 | 118.40 | 26.40 |
| BCS/318 | 17/8 | 19650 | 1425.41 | 191.32 | 18/7 | 19800 | 910.50 | 198.40 |
| ATMIF/512 | 23/7 | 11700 | 3104.38 | 208.95 | 24/7 | 11800 | 1419.40 | 214.60 |
| BATIF1/728 | 27/11 | 14100 | 12380.10 | 234.46 | 28/11 | 14214 | 3942.70 | 238.24 |
| BATIF2/845 | 33/12 | 16005 | 18961.53 | 301.45 | 35/12 | 16088 | 10418.64 | 307.10 |
| OASIF/1072 | 42/14 | 25995 | 38204.75 | 370.52 | 44/16 | 27145 | 16864.70 | 381.70 |

TABLE 5: JOINT EFFICACY OF ASSOCIATION ARRAY AND TASK CLUSTERING

| EXAMPLE/ NO. OF TASKS | COSYN WITHOUT ASSOCIATION ARRAY AND CLUSTERING | | | | COSYN | | | |
| --- | --- | --- | --- | --- | --- | --- | --- | --- |
| | NO. OF PEs/ LINKS | COST($) | CPU TIME (SEC) | AVERAGE POWER DISSIPATION (WATTS) | NO. OF PEs/ LINKS | COST($) | CPU TIME (SEC) | AVERAGE POWER DISSIPATION (WATTS) |
| BETS1/15 | 2/1 | 305 | 4.49 | 4.11 | 2/1 | 305 | 0.54 | 4.43 |
| BETS2/45 | 4/3 | 455 | 6.87 | 7.10 | 4/3 | 455 | 1.42 | 7.72 |
| BETS3/156 | 13/11 | 1725 | 1749.95 | 24.35 | 13/11 | 1725 | 118.40 | 26.40 |
| BCS/318 | 16/8 | 19550 | 10088.34 | 187.60 | 18/7 | 19800 | 910.50 | 198.40 |
| ATMIF/512 | 22/7 | 11590 | 14364.33 | 193.82 | 24/7 | 11800 | 1419.40 | 214.60 |
| BATIF1/728 | 26/11 | 14005 | 44434.28 | 230.20 | 28/11 | 14214 | 3942.70 | 238.24 |
| BATIF2/845 | 32/11 | 15750 | 90537.98 | 294.62 | 35/12 | 16088 | 10418.64 | 307.10 |
| OASIF/1072 | 42/14 | 25890 | 120412.96 | 363.11 | 44/16 | 27145 | 16864.70 | 381.70 |

TABLE 6: EFFICACY OF MULTIPLE SUPPLY VOLTAGE BASED RESOURCE LIBRARY

| EXAMPLE/ NO. OF TASKS | COSYN USING A RESOURCE LIBRARY WITH 5V PEs ONLY | | | | COSYN | | | |
| --- | --- | --- | --- | --- | --- | --- | --- | --- |
| | NO. OF PEs/ LINKS | COST($) | CPU TIME (SEC) | AVERAGE POWER DISSIPATION (WATTS) | NO. OF PEs/ LINKS | COST($) | CPU TIME (SEC) | AVERAGE POWER DISSIPATION (WATTS) |
| BETS1/15 | 4/2 | 410 | 0.45 | 8.93 | 2/1 | 305 | 0.54 | 4.43 |
| BETS2/45 | 9/4 | 612 | 1.67 | 12.46 | 4/3 | 455 | 1.42 | 7.72 |
| BETS3/156 | ARCHITECTURE IS NOT FEASIBLE | | | | 13/11 | 1725 | 118.40 | 26.40 |
| BCS/318 | ARCHITECTURE IS NOT FEASIBLE | | | | 18/7 | 19800 | 910.50 | 198.40 |
| ATMIF/512 | 25/5 | 12400 | 1400.10 | 298.72 | 24/7 | 11800 | 1419.40 | 214.60 |
| BATIF1/728 | 30/12 | 15308 | 3890.51 | 356.60 | 28/11 | 14214 | 3942.70 | 238.24 |
| BATIF2/845 | 37/14 | 17145 | 10335.60 | 411.62 | 35/12 | 16088 | 10418.64 | 307.10 |
| OASIF/1072 | 47/17 | 27850 | 15989.38 | 509.56 | 44/16 | 27145 | 16864.70 | 381.70 |

TABLE 7: COSYN VS. COSYN-LP

| EXAMPLE/ NO. OF TASKS | COSYN | | | | COSYN-LP | | | | ACTUAL TRANSPORT SYSTEM |
|---|---|---|---|---|---|---|---|---|---|
| | NO. OF PEs/ LINKS | COST($) | CPU TIME (SEC) | AVERAGE POWER DISSI- PATION (WATTS) | NO. OF PEs/ LINKS | COST($) | CPU TIME (SEC) | AVERAGE POWER DISSI- PATION (WATTS) | AVERAGE POWER DISSI- PATION (WATTS) |
| BETS1/15 | 2/1 | 305 | 0.54 | 4.43 | 3/1 | 368 | 1.20 | 2.66 | 2.45 |
| BETS2/45 | 4/3 | 455 | 1.42 | 7.72 | 5/4 | 554 | 2.20 | 5.73 | 5.29 |
| BETS3/156 | 13/11 | 1725 | 118.40 | 26.40 | 12/10 | 1993 | 142.56 | 23.57 | 22.18 |
| BCS/318 | 18/7 | 19800 | 910.50 | 198.40 | 16/8 | 22400 | 1018.72 | 161.34 | 154.10 |
| ATMIF/512 | 24/7 | 11800 | 1419.40 | 214.60 | 25/9 | 12760 | 1609.63 | 178.15 | 166.90 |
| BATIF1/728 | 28/11 | 14214 | 3942.70 | 238.24 | 28/12 | 16224 | 5046.70 | 211.15 | 199.80 |
| BATIF2/845 | 35/12 | 16088 | 10418.64 | 307.10 | 35/12 | 17600 | 12166.84 | 240.80 | 225.60 |
| OASIF/1072 | 44/16 | 27145 | 16864.70 | 381.70 | 47/18 | 29425 | 19910.21 | 337.42 | 312.41 |

SCHEDULING-BASED HARDWARE-SOFTWARE CO-SYNTHESIS OF HETEROGENEOUS DISTRIBUTED EMBEDDED SYSTEMS

CROSS-REFERENCES TO RELATED APPLICATIONS

This nonprovisional U.S. national application, filed under 35 U.S.C. § 111(a), claims, under 35 U.S.C. § 119(e)(1), the benefit of the filing dates of (1) provisional U.S. national application no. 60/038,488, filed under 35 U.S.C. § 111(b) on Feb. 24, 1997; (2) provisional U.S. national application no. 60/038,934, filed under 35 U.S.C. § 111(b) on Feb. 24, 1997; and (3) provisional U.S. national application no. 60/054,709, filed under 35 U.S.C. § 111(b) on Aug. 4, 1997, the teachings of all three of which are incorporated herein by reference.

This application is one of the set of U.S. patent applications consisting of Ser. Nos. 09/024,604; 09/024,605; 09/025,539; 09/024,839; 09/025,097; 09/024,762, all of which share the same filing date and the teachings of all of which are incorporated herein by reference.

BACKGROUND OF THE INVENTION

1. Field of the Invention

The present invention relates to the design of real-time distributed embedded systems, and, in particular, to the process of partitioning an embedded system specification into hardware and software modules using hardware-software co-synthesis.

2. Description of the Related Art

Advancements in VLSI, computer-aided design, and packaging areas have resulted in an explosive growth and interest in embedded system development. In real life, many embedded systems perform a multitude of complex tasks. Heterogeneous distributed architectures are very common for telecom and other embedded systems, where several processors and application-specific integrated circuits (ASICs) of different types are interconnected by various types of communication links, and a multitude of tasks are concurrently run on the system. Each of these tasks can be executed on a variety of software and hardware platforms which have different dollar costs. For example: 1) a telecom protocol handling function can be implemented on a general-purpose processor (software) or an ASIC (hardware), 2) an information packet (control or communication data) can be transferred via an I2C link, a 1 Mb/s local area network (LAN), a 680X0 bus, or a 10 Mb/s Ethernet LAN. Each option has varying hardware, delay, and power requirements. Parameters such as hardware, delay, and power are usually estimated by simulation/synthesis or laboratory measurement from previous designs.

The embedded system architecture has generally been defined based on the experience of system architects, and, at times, it is either over-designed or fails to meet the requirements. Finding an optimal hardware-software architecture entails selection of processors, ASICs, and communication links such that the cost of the embedded system architecture is minimum and all real-time constraints are met. Hardware-software co-synthesis involves various steps such as allocation, scheduling, and performance estimation. Both allocation and scheduling are known to be NP-complete, where NP stands for non-deterministically polynomial. See References (1)–(2). Therefore, optimal co-synthesis is computationally a very hard problem.

Researchers have primarily focused their interest in last several years on hardware-software co-synthesis of one-CPU-one-ASIC architectures, where attempts have been made to move operations from hardware to software or vice versa to minimize cost and meet deadlines. See References (3)–(9). In the area of distributed system co-synthesis, the target architecture can employ multiple CPUs, ASICs, and field-programmable gate arrays (FPGAs). See Reference (10). Emphasis on distributed embedded system architecture co-synthesis and partitioning is fairly recent. See References (11)–(17). Two distinct approaches have been used to solve the distributed system co-synthesis problem: optimal and heuristic.

In the optimal domain, the approaches are: 1) mixed integer linear programming (MILP) and 2) exhaustive. The MILP solution proposed in Reference (11) has the following limitations: 1) it is restricted to one task graph, 2) it does not handle preemptive scheduling, 3) it requires determination of the interconnection topology up front, and 4) because of time complexity, it is suitable only for small task graphs (having 10 or so tasks). A configuration-level hardware-software partitioning algorithm is presented in Reference (12) based on an exhaustive enumeration of all possible solutions. Its limitations are: 1) it allows an architecture with at most one CPU, 2) simulation is used for performance evaluation which is very time-consuming, and 3) the communication overheads are ignored.

There are two distinct approaches in the heuristic domain: 1) iterative, where an initial solution is iteratively improved through various moves, and 2) constructive, where the solution is built step-by-step and the complete solution is not available until the algorithm terminates. In References (13)–(15), an iterative procedure is given. It considers only one type of communication link and does not allow mapping of each successive copy of a periodic task to a different processing element (PE). Another iterative synthesis technique for low-power systems is presented in Reference (16). Its limitations are: 1) it ignores inter-task communications, and 2) it is restricted to periodic task graphs where deadline is equal to period. A constructive co-synthesis procedure for fault-tolerant distributed embedded systems is proposed in Reference (17). However, it does not support communication topologies such as bus, LAN, etc., and its allocation step uses a pessimistic performance evaluation technique which may increase system cost. Also, it assumes that computation and communication can always be done in parallel, which may not be true. It is also not suitable for multi-rate embedded systems, e.g., multi-media systems.

SUMMARY OF THE INVENTION

The present invention is related to a heuristic-based co-synthesis technique, called COSYN, which includes allocation, scheduling, and performance estimation steps as well as power optimization features. The allocation step determines the mapping of tasks to processing elements (PEs) and inter-task communications to communication links. The scheduling step determines the sequencing of tasks mapped to a PE and sequencing of communications on a link. The performance estimation step estimates the finish time of each task and determines the overall quality of the system in terms of its dollar cost, power consumption, fault tolerance, etc. COSYN allows multiple types and forms of PEs and communication links, supports both concurrent and sequential modes of communication and computation, employs a combination of preemptive and non-preemptive scheduling, and introduces a new concept of an association array to tackle the problem of multi-rate tasks. It supports task graphs where different tasks have different deadlines. It also supports task graph pipelining to derive a cost-efficient architecture. It employs a deadline-based static scheduling technique which forms the basis of an accurate finish-time estimation scheme for allocation evaluation. It includes a new task clustering technique which takes the changing nature of the critical path into account. Since many embedded systems are becoming part of the mobile applications arena, both peak and average power consumption have become important concerns for such systems. The peak power consumption determines the packaging cost and the average power consumption determines the battery life. Thus, COSYN takes both types of power consumption into account during co-synthesis. It supports a mix of different technologies, such as 5 V CMOS, 3.3 V CMOS, 2.7 V CMOS, ECL, etc., requiring a wide range of supply voltages, to reduce power consumption and meet embedded system constraints. In general, embedded system tasks are reused across multiple functions and an efficient co-synthesis algorithm exploits this fact to provide efficient architectures. Also proposed is the concept of architectural hints and architectural reuse for this purpose. The technique is suited to both small- and large-scale real-time embedded systems. Application of this technique to several examples from the literature and real-life telecom transport systems shows that it compares very favorably with known co-synthesis algorithms in terms of CPU time, quality of solution, and number of features. In fact, for the task graphs from the literature for which MILP-based optimal results are known, COSYN also obtained the same optimal results in many orders of magnitude smaller CPU time.

In one embodiment, the present invention is a method for designing the architecture of an embedded system, comprising a pre-processing phase and a synthesis phase. The pre-processing phase comprises the steps of (1) parsing one or more task graphs, one or more system/task constraints, and a resource library for the embedded system; and (2) generating an association array for the task graphs, wherein the association array stores a limited amount of information for each instance of a task graph of the embedded system to eliminate replication of the task graph and its associated parameters. The synthesis phase, following the pre-processing phase, comprises the step of allocating one or more groups of one or more tasks in the tasks graphs to one or more processing elements in the resource library and allocating one or more edges in the tasks graphs to one or more communication links in the resource library, based on performance evaluation of one or more possible allocations for each of the groups and edges in light of the system/task constraints, wherein the performance evaluation uses the association array.

In an alternative embodiment, the present invention is a method for designing the architecture of an embedded system, comprising a pre-processing phase and a synthesis phase. The pre-processing phase comprises the steps of (1) parsing one or more task graphs, one or more system/task constraints, and a resource library for the embedded system; and (2) defining a hyperperiod for the embedded system, wherein the hyperperiod comprises hyperperiod spill to account for one or more task graphs that do not complete within the hyperperiod, wherein the hyperperiod spill is allocated at the beginning of the hyperperiod. The synthesis phase, following the pre-processing phase, comprises the step of allocating one or more groups of one or more tasks in the tasks graphs to one or more processing elements in the resource library and allocating one or more edges in the tasks graphs to one or more communication links in the resource library, based on performance evaluation of one or more possible allocations for each of the groups and edges in light of the system/task constraints, wherein the performance evaluation is based on the hyperperiod with the hyperperiod spill.

In another alternative embodiment, the present invention is a method for designing the architecture of an embedded system, comprising a pre-processing phase and a synthesis phase. The pre-processing phase comprises the step of parsing one or more task graphs, one or more system/task constraints, and a resource library for the embedded system. The synthesis phase, following the pre-processing phase, comprises the steps of (1) generating an allocation array for each group of one or more tasks in the tasks graphs and each edge in the task graph, wherein the allocation array comprises one or more different possible allocations for the groups and edges arranged based on a selected cost function; and (2) allocating each group to a processing element in the resource library and each edge to a communication link in the resource library, by evaluating performance of the one or more possible allocations in the corresponding allocation array in light of the system/task constraints.

In yet another alternative embodiment, the present invention is a method for designing the architecture of an embedded system, comprising a pre-processing phase and a synthesis phase. The pre-processing phase comprises the step of parsing one or more task graphs, one or more system/task constraints, and a resource library for the embedded system. The synthesis phase, following the pre-processing phase, comprises the steps of (1) selecting possible allocations for each group of one or more tasks in the task graphs and each edge in the task graphs; (2) performing scheduling for each selected allocation; (3) evaluating performance of each selected allocation based on results of the scheduling in light of the system/task constraints; and (4) allocating each group to a processing element in the resource library and each edge to a communication link in the resource library, based on results of the performance evaluation.

BRIEF DESCRIPTION OF THE DRAWINGS

Other aspects, features, and advantages of the present invention will become more fully apparent from the following detailed description, the appended claims, and the accompanying drawings in which:

FIG. 1 shows an exemplary task graph, resource library, execution/communication vectors, and corresponding finish time estimate (FTE) graph, respectively;

FIG. 4 shows the pseudo-code for the COSYN procedure;

FIG. 5 shows the pseudo-code for the association array formation procedure, according to one embodiment of the present invention;

FIG. 6 shows exemplary task graphs, corresponding association array, and corresponding architecture, respectively;

FIG. 7 shows exemplary hyperperiod task graphs for the Lawler and Martel approach and for the COSYN approach, respectively;

FIG. 9 shows the pseudo-code for the critical-path-based clustering procedure, according to one embodiment of the present invention;

FIG. 10 shows the pseudo-code for the cluster growth procedure, according to one embodiment of the present invention;

FIG. 12 shows an exemplary task graph, the corresponding task graph after clustering, and corresponding replication of tasks, respectively;

FIG. 13 shows the pseudo-code for the allocation array formation procedure, according to one embodiment of the present invention;

FIG. 14 shows the pseudo-code for the procedure for scheduling task graphs, according to one embodiment of the present invention;

FIG. 16 shows exemplary task graphs and associated information, a corresponding architecture, and a corresponding schedule, respectively;

FIG. 17 shows an exemplary embedded system architecture, a corresponding power distribution architecture for Module 1, and a corresponding power distribution architecture for Module 2, respectively;

FIGS. 19(a)–(f) shows an exemplary task graph, a corresponding COSYN clustering, a corresponding COSYN architecture, a corresponding COSYN-LP clustering, a corresponding COSYN-LP architecture, and average power for the corresponding execution and communication vectors, respectively;

Figure 2A:
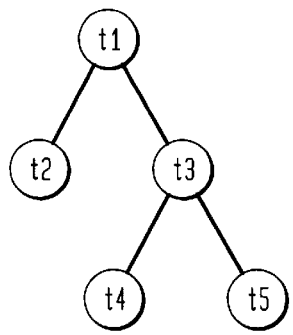
FIG. 2 shows task graphs that demonstrate architecture reuse.

Table 1 shows characteristics of different examples from the literature;

Table 2 shows experimental results for different task graphs from the literature;

Table 3 shows the efficacy of the present association array concept;

Table 4 shows the efficacy of the present task clustering concept;

Table 5 shows the joint efficacy of the present association array and task clustering concepts;

Table 6 shows the efficacy of the present concept of resource libraries having multiple supply voltages; and Table 7 shows a comparison of the COSYN and COSYN-LP techniques.

DETAILED DESCRIPTION

1 Definitions and Basic Concepts

Embedded systems comprise off-the-shelf general-purpose processors (e.g., Intel Pentium™ or Motorola 680X0™), ASICs, FPGAs, and voltage translation buffers to perform application-specific functions. The hardware architecture of an embedded system defines the type and interconnection of various hardware modules. Its software architecture defines the allocation of sequence of codes to specific general-purpose processors. Hardware-software co-synthesis is the process of obtaining the hardware and software architectures to meet specific goals, such as performance, power, and/or cost.

Each application-specific function is made up of several sequential and/or concurrent jobs. Each job is made up of several tasks. Tasks are atomic units performed by embedded systems. A task contains both data and control flow information. The embedded system functionality is usually described through a set of task graphs. Nodes of a task graph represent tasks. Tasks communicate data to each other. This is indicated by a directed edge between two communicating tasks. Task graphs can be periodic or aperiodic. The present application focuses on periodic task graphs. Each periodic task graph has an earliest start time (EST), a period, and one or more deadlines, as shown for example in FIG. 1(a). Each task of a periodic task graph inherits the graph's period. Each task in a task graph can have a different deadline.

The PE library is a collection of all available PEs. The link library is a collection of all available communication links. The PE and link libraries together form the resource library. The resource library and its costs for two general-purpose processors, PE1 and PE2, and two links, L1 and L2, are shown in FIG. 1(b).

Execution_vector($t_i$)={$\alpha_{i1},\alpha_{i2},\ldots,\alpha_{in}$} is defined to be an execution vector of task $t_i$, where $\alpha_{ij}$ indicates the execution time of task $t_i$ on PEj from the PE library. $\alpha^{min}(t_i)$ and $\alpha^{max}(t_i)$ denote the minimum and maximum execution times in this vector, respectively. In the example task graph of FIG. 1, for simplicity, all tasks are assumed to have the same execution vector, as shown in FIG. 1(c). However, in general, different tasks can have different execution vectors. Preference_vector($t_i$)={$\gamma_{i1},\gamma_{i2},\ldots,Y_{in}$} is defined to be a preference vector of task $t_i$, where $\gamma_{ij}$ indicates preferential mapping for task $t_i$. If $\gamma_{ij}$ is 0, it indicates that $t_i$ cannot be executed on PEj, and 1 if there are no constraints. This vector is useful in cases where preferred allocation is determined based on prior experience or task characteristics. Similarly, the exclusion vector of task $t_i$, exclusion_vector($t_i$)={$\delta_{i1},\delta_{i2},\ldots,\delta_{iq}$}, specifies whether certain tasks can co-exist on the same PE or not, i.e., $\delta_{ij}=1$ indicates that tasks $t_i$ and $t_j$ have to be allocated to different processors, and $\delta_{ij}=0$ indicates otherwise.

A cluster of tasks is a group of tasks all of which are allocated to the same PE. Preference_vector($C_i$) of cluster $C_i$ is defined to be the bit-wise logical AND of the preference vectors of all the tasks in the cluster. The preference vector of a cluster indicates those PEs to which the cluster cannot be allocated. Similarly, exclusion_vector($C_i$) of cluster $C_i$ is defined to be the bit-wise logical OR of the exclusion vectors of all the tasks in the cluster. A task $t_i$ is said to be preference-compatible with cluster $C_i$ if the bit-wise logical AND of the preference vector of cluster $C_i$ and task $t_i$ does not result in the zero-vector, i.e., a vector with all elements zero. If all elements of a preference vector of cluster $C_i$ are zero, it makes the cluster unallocatable to any PE. Task $t_j$ is said to be exclusion-compatible with cluster $C_i$ if the jth entry of the exclusion vector of $C_i$ is zero. This indicates that tasks in cluster $C_i$ can be co-allocated with task $t_j$. Task $t_j$ and cluster $C_i$ are simply called compatible with each other, if $t_j$ is both preference- and exclusion-compatible with cluster $C_i$.

Communication_vector($e_k$)={$\beta_{k1},\beta_{k2},\ldots,\beta_{km}$} is defined to be the communication vector of task graph edge $e_k$, where $\beta_{k1}$ indicates the time it takes to communicate the data on edge $e_k$ on communication link 1 from the link library. The communication vector for each edge in the task graph of FIG. 1(a) is given in FIG. 1(c). $\beta^{min}(e_k)$ and $\Theta^{max}(e_k)$ denote the minimum and maximum communication times in this vector, respectively. As mentioned before, a communication link can take different forms such as point-to-point, bus, LAN, etc. This is taken into consideration through the communication vector. The communication vector for each edge is computed a priori for various types of links as follows. Let $\rho_k$ be the number of bytes that need to be communicated on edge $e_k$, and $\lambda_l$ be the number of bytes per packet that link l can support, excluding the packet overhead. The access_time_vector(l)=$[\Omega_{l1}, \Omega_{l2}, \ldots, \Omega_{lm}]$ is an access time vector for link l, where $\Omega_{lr}$ represents the access time per packet with r number of communication ports on link l. Suppose the link under consideration, l, has s ports. Let $\tau_l$ be the communication time of a packet on link l. Then $\beta_{k1}$ is given by Equation (1) as follows:

$$\beta_{k1} = \{\lceil (\rho_k) \div (\lambda_l) \rceil \cdot (\tau_l + \Omega_{ls})\} \quad (1)$$

The link access overhead per packet can be reduced in case of large messages requiring multiple packets. At the beginning of co-synthesis, since the actual number of communication ports on the links is not known, an average number of communication ports (specified a priori) is initially used to determine the communication vector. This vector is recomputed after each allocation, considering the actual number of ports on the link.

Average_power_vector($t_i$)=$\{\xi_{i1}, \xi_{i2}, \ldots, \xi_{in}\}$ is defined to be the average power vector of task $t_i$, where $\xi_{ij}$ indicates the average power consumption of task $t_i$ on PEj. The average power is determined considering normal operating conditions, e.g., nominal voltage levels, average data stream, etc. Similarly, peak_power_vector($t_i$)=$\{\kappa_{i1}, \kappa_{i2}, \ldots, \kappa_{in}\}$ is defined to be the peak power vector of task $t_i$, where $\kappa_{ij}$ indicates the peak power consumption of task $t_i$ on PEj. The peak power dissipation is determined considering worst-case operating conditions, e.g., worst-case operating voltage, worst-case data stream, etc. The preference vector, exclusion vector, and average and peak power vectors can be similarly defined for communication edges and links. Also taken into account are the quiescent power of a PE, link, ASIC, and FPGA, which indicates its power consumption at times when no task (or communication) is being executed on it.

The memory architecture of embedded systems plays an important role from both performance and cost point of view. Thus, it is very important that the co-synthesis algorithm address these needs, whereas previous algorithms have generally ignored this aspect. The storage requirements are of different types: program storage, data storage, and stack storage. For each task mapped to software, memory needs are specified by a memory vector. The memory vector of task $t_i$ is defined as: memory_vector($t_i$)=$\{\text{program\_storage }(t_i), \text{data\_storage }(t_i), \text{stack\_storage }(t_i)\}$. For each allocation, whether the available memory capacity has been exceeded is checked.

Two modes of communication are allowed: 1) sequential, i.e., where communication and computation cannot go on simultaneously, and 2) concurrent, i.e., where communication and computation can go on simultaneously if supported by the associated communication link and PEs.

For each available processor, its cost, supply voltage, average quiescent power consumption, peak power constraint, and associated peripheral attributes, such as memory architecture, number of communication ports, processor-link communication characteristics, and cache characteristics, are assumed to be specified. In addition, the preemption overhead for each processor is specified a priori along with its execution time, as well as average and peak power consumption. For each ASIC, its cost, supply voltage, and package attributes, such as available pins, available gates, and average and peak power dissipation per gate, are assumed to be specified. Similarly, for each FPGA, its cost, supply voltage, average quiescent power, and package attributes, such as available pins and the maximum number of flip-flops or combinational logic blocks (CLBs) or programmable functional units (PFUs), are assumed to be specified. Another important attribute of an FPGA is the boot memory which needs to be allocated for the FPGA. Generally, all flip-flops/CLBs/PFUs are not usable due to routing restrictions. A very high utilization of flip-flops/CLBs/PFUs and pins may force the router to route the nets such that it may exceed the execution time (delay constraint) defined by the execution vector. This is taken into account through a term called the effective usage factor (EUF). Based on previous design experience, an EUF of 70% has been assumed for the experimental results to determine the percentage of the logical blocks that are actually usable for allocation purposes. The user is also allowed to specify an EUF based on his/her own experience. The user can also specify the effective pin usage factor (EPUF) to indicate what percentage of package pins can be used for allocation (default is 80% to allow for pins for power, ground, and due to routing restrictions). The default percentages used for EUF and EPUF were derived based on existing designs, and experimentally verified to guarantee the satisfaction of delay constraints.

Communication links, which are used to interconnect PEs, can have varying topologies, as mentioned before. Each communication link is characterized by: 1) the number of information bytes per packet, 2) maximum number of communication ports, 3) link access time vector, 4) communication time per packet, 5) average quiescent power, and 6) peak power constraint.

Figure 2B:
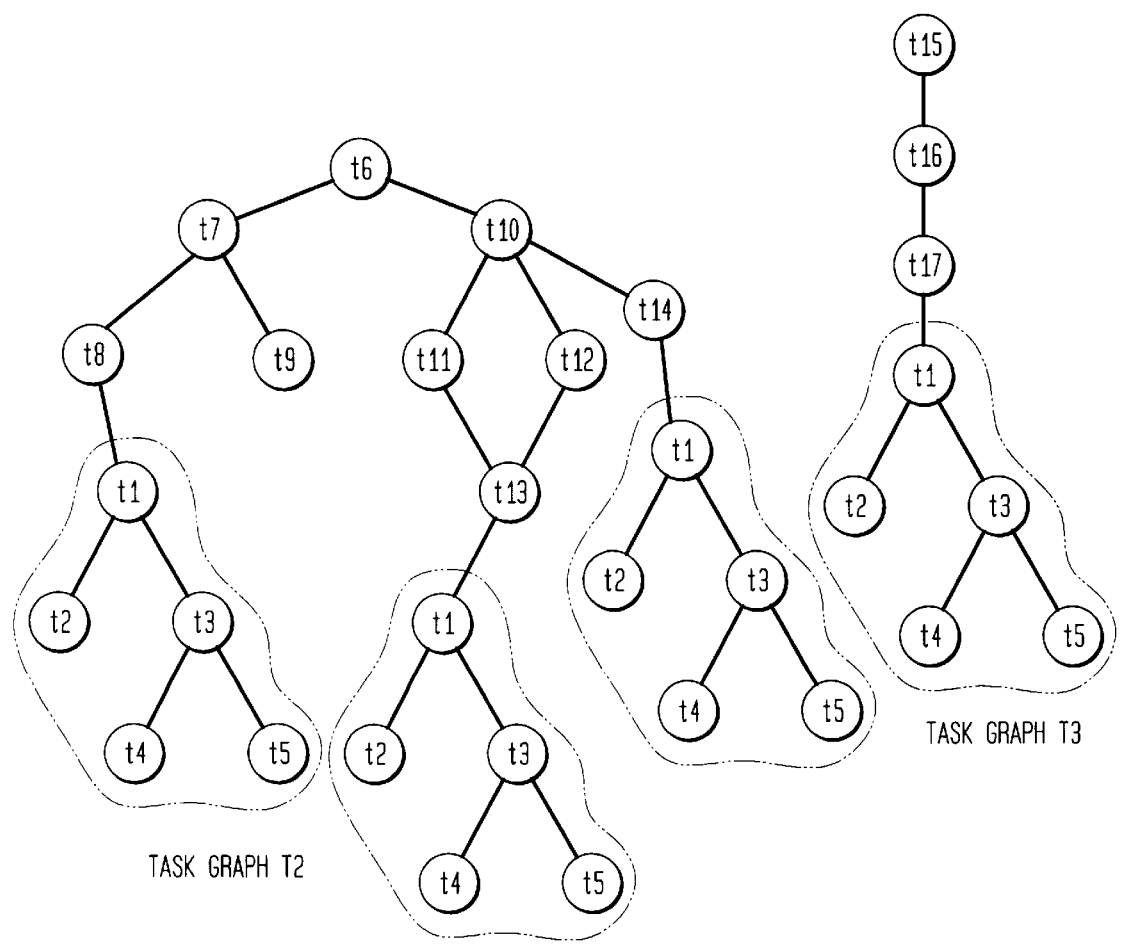

Generally, several tasks are reused across multiple functions. For example, task graph T1, shown in FIG. 2(a), is used as a sub-graph in task graphs T2 and T3, shown in FIG. 2(b), as indicated by the enclosures. A co-synthesis algorithm can be significantly sped up by exploiting this fact. This can be done through the concept of architectural hints. These hints are derived during the task graph generation phase based on the experience from previous designs, nature of embedded system task graphs, and type of resource library. If an architectural hint indicates that the task or sub-task-graph is marked for reuse, then the co-synthesis algorithm is run for each such task/sub-task-graph, and the solution is stored as an architectural template. During allocation, if such a task/sub-task-graph is being considered, then, if necessary (the template may already be in the partial architecture), the architectural template is added to the partial architecture, and the co-synthesis process proceeds further. Architectural hints are also used to indicate whether the given task is suitable for preemption. Note that architectural hints are not necessary for the success of the COSYN algorithm. However, the algorithm exploits them whenever they are available.

2 The COSYN Algorithm

Figure 3:
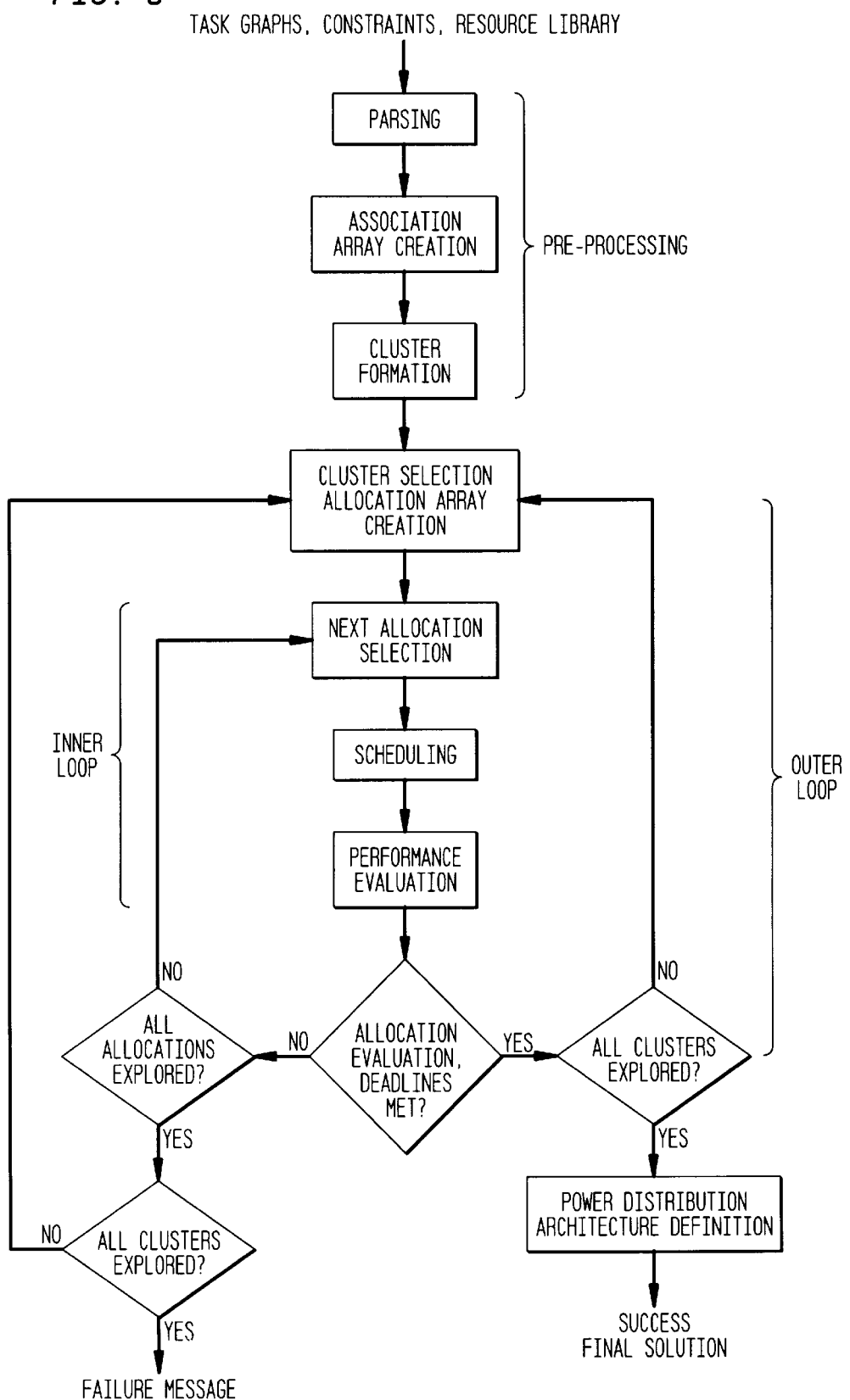
FIG. 3 shows the co-synthesis process flow, according to one embodiment of the present invention.

In this section, an overview of the COSYN algorithm is provided followed up by details on each step. FIG. 3 presents a co-synthesis process flow, according to one embodiment of the present invention. In the parsing step, the task graphs, system/task constraints, and resource library are parsed and appropriate data structures are created. The hyperperiod of the system is computed as the least common multiple (LCM) of the period of various task graphs. In traditional real-time computing theory, if $\text{period}_i$ is the period of task graph i then $\{\text{hyperperiod} \div \text{period}_i\}$ copies are obtained for it. See Reference (18). However, this is impractical from both co-synthesis CPU time and memory requirements point of view, especially for multi-rate task graphs where this ratio may be very large. In a preferred embodiment of the present invention, this problem is addressed using the concept of an association array, which is introduced later. The clustering step involves grouping of tasks to reduce the search space for the allocation step. See References (17), (19), and (20). Tasks in a cluster get mapped to the same PE. This significantly reduces the overall complexity of the co-synthesis algorithm since allocation is part of the inner loop of this algorithm. Clusters are ordered based on their importance/priority (extending the deadline-based priority calculation technique from Reference (17) for this purpose). The allocation step determines mapping of tasks and edges to PEs and communication links, respectively. There are two loops in this co-synthesis process flow: 1) an outer loop for selecting a cluster, and 2) an inner loop for evaluating various allocations for each selected cluster. For each cluster, an allocation array consisting of the possible allocations is created. By limiting the number of PEs and links that can be added to the partially developed architecture at any allocation step, the size of the allocation array can be maintained at manageable levels. While allocating a cluster to a hardware module such as an ASIC or FPGA, it is made sure that the module capacity related to pinout, gate count, and package power dissipation is not exceeded. Similarly, while allocating a cluster to a general-purpose processor, it is made sure that the memory capacity of the PE is not exceeded. Inter-cluster edges are allocated to resources from the link library.

The next step is scheduling which determines the relative ordering of task/communication execution and the start and finish times for each task and edge. A combination of preemptive and non-preemptive static scheduling is employed. Also taken into consideration are the operating system overheads such as interrupt overhead, context-switch, remote procedure call (RPC), etc., through a parameter called preemption overhead (this information is experimentally determined and provided a priori). Incorporating scheduling into the inner loop facilitates accurate performance evaluation.

Performance evaluation of an allocation is extremely important in picking the best allocation. An important part of performance evaluation is finish-time estimation (FTE). This estimation process uses the start and finish times of each task and estimates whether the tasks with specified deadlines meet those deadlines or not using the longest path algorithm. The allocation evaluation step compares the current allocation against previous ones based on total dollar cost. If there are more than one allocation with equal dollar cost, the allocation with the lowest average power consumption is picked (assuming power needs to be optimized). Other attributes such as memory requirements and peak power dissipation can also be used to further evaluate the allocations. Once all clusters are allocated and all deadlines are met, the power distribution architecture of the embedded system is defined. The power distribution architecture describes the interconnection and size of the power converters to meet the power supply requirements of various PEs and links of the embedded system architecture. FIG. 4 gives the pseudo-code for the COSYN procedure. The following sections describe each step of COSYN in detail.

2.1 The Association Array

It was shown in Reference (18) that there exists a feasible schedule for a job if and only if there exists a feasible schedule for the hyperperiod. Therefore, traditionally, as mentioned before, each task graph is replicated the requisite number of times in the hyperperiod. This is the approach used in References (16)–(17). The advantage of this approach is that it allows different copies of a task to be allocated to different PEs. However, this flexibility comes at a severe price in terms of co-synthesis CPU time and memory requirement when the hyperperiod is large compared to the periods. This could happen, for example, if the periods are comparable but co-prime or when one period is much larger than the others (as may happen in multimedia systems). As an example, suppose that the periods of task graphs 1 and 2 are 2807 and 759, respectively. Then the hyperperiod is 2,130,513, and 759 copies of task graph 1 and 2807 copies of task graph 2 would need to be made. One way to tackle this problem is through the use of an analytical technique such as fixed-point iteration, which does not require any task graph replication. See References (13)–(15). However, this comes at the price of not allowing different copies of the task to be allocated to different PEs, thus, potentially, increasing embedded system cost. In order to address the limitations of both methods, two approaches are proposed: 1) use of task graph period adjustment to reduce the hyperperiod (see References (18)–(19)), and 2) use of an association array.

In the first approach, some of the periods are shortened by a small user-adjustable amount (e.g., up to 3% used as a default) to reduce the hyperperiod. This is frequently useful even if the periods are not co-prime, but the hyperperiod is large. Doing this usually does not affect the feasibility of the co-synthesis solution or the cost of the distributed architecture. For example, if the periods of task graphs 1 and 2 given before are adjusted to 2750 and 750, respectively, then the resulting hyperperiod is 8250. Thus, only three copies of task graph 1 and only 11 copies of task graph 2 would be required using the traditional method.

Even though the task graph period adjustment technique can reduce the number of copies and memory requirements, it may still require a large number of copies when there are wide variations in the task graph periods. For example, in multimedia systems, one task graph representing video processing may have a small period while another task graph representing audio processing may have a large period. The concept of an association array is used to avoid the actual replication of task graphs. An association array has an entry for each task of each copy of the task graph and contains information such as: 1) the PE to which it is allocated, 2) its priority level, 3) its deadline, 4) its best-case projected finish time (PFT), and 5) its worst-case PFT. The deadline of the nth instance of a task is offset by (n−1) multiplied by its period from the deadline in the original task. The association array not only eliminates the need to replicate the task graphs, but it also allows allocation of different task graph copies to different PEs, if desirable, to derive an efficient architecture. This array also supports pipelining of task graphs, which is explained later in this specification.

There are two types of periodic task graphs: 1) those with a deadline less than or equal to the period, and 2) those with a deadline greater than the period. In order to address this fact, an association array can have two dimensions, as explained next. If a task graph has a deadline less than or equal to its period, it implies that there will be only one instance of the task graph in execution at any instant. Such a task graph needs only one dimension in the association array, called the horizontal dimension. If a task graph has a deadline greater than the period, it implies that there can be more than one instance of this task graph in execution at some instant. For such tasks, a two-dimensional association array is created, where the vertical dimension corresponds to concurrent execution of different instances of the task graph.

During the preprocessing step, for each task graph with a deadline greater than its period, the association array depth and the modified period are determined. The depth of an association array for such a task graph is given by ⌈(deadline of task graph÷period)⌉, and its modified period is equal to the depth of the array multiplied by the original period. A task graph with a deadline less than or equal to its period does not require any modification of the period. The hyperperiod is computed based on the modified periods. The rows of the association array represent the concurrent existence of different instances of the task graph. Each row of the association array for a task graph inherits the modified period. The columns of the association array represent various copies of the task graph in the hyperperiod. FIG. 5 gives the pseudo-code for the association array formation procedure.

Copy 1 of the task in the first row inherits the EST and deadline from its task graph. If there are multiple tasks with different deadlines in the original task graph, then each task in the association array would inherit the corresponding deadline from the task graph. The best- and worst-case start and finish times of the first copy are determined through scheduling and finish time estimation (which are discussed later). For the remaining copies, all parameters are set based on the parameters of the first copy. For example, the EST of the nth copy={the EST of copy 1+(n−1)·modified period}. Whenever desirable, the algorithm tries to allocate different copies to different PEs in the distributed architecture to derive a cost-effective architecture.

To illustrate the concept of the two-dimensional association array, consider task graphs 1 and 2 shown in FIG. 6(*a*). For simplicity, assume that there is only one task in each task graph and only one type of PE is available. The execution times of the tasks on this PE are shown next to the corresponding nodes in FIG. 6(*a*). The deadline of task graph 1 is greater than its period, and there could be up to four instances of task graph 1 executing at any instant. The modified period of task graph 1 is obtained as ⌈(deadline of task graph÷period)⌉ multiplied by the period. Therefore, the modified period for task graph 1 is 40, and the hyperperiod of task graphs 1 and 2 is 80. For task graph 1, an association array is created whose horizontal dimension is equal to [hyperperiod÷modified period] and vertical dimension is ⌈(deadline of task graph÷period)⌉. The association array for task graphs 1 and 2 is shown in FIG. 6(*b*). FIG. 6(*c*) illustrates the associated architecture.

Another limitation of the approach of Reference (18) is that the execution of all copies of all tasks must complete by the hyperperiod. However, this approach puts significant restrictions on the types of tasks supported by the execution model and the associated scheduler. For example, as shown in FIG. 7(*a*), all copies of task graphs 3 and 4 must complete within the hyperperiod boundary. However, tasks, which do not start at EST=0, may have the execution interval of their last copy exceed the hyperperiod. For example, if EST of task graph 3 is set equal to 1, as shown in FIG. 7(*b*), the execution interval of its third copy would exceed the hyperperiod boundary. To address this problem, the deadline of the last copy of the task graph can be set equal to the hyperperiod. However, this approach generally results in an increase in system cost. To address this concern, the concept of hyperperiod spill is used. The portion of the execution interval, which exceeds the hyperperiod, is defined as hyperperiod spill.

In order to ensure that the resulting schedule is feasible and resources are not overused, space is made for the hyperperiod spill at the beginning of the hyperperiod (since the schedule derived for a hyperperiod is repeated for successive hyperperiods). Hence, the priority level of such tasks is enhanced by adding the hyperperiod to it (a formal definition of priority level is given in Section 2.2). Doing this gives such tasks much higher priority than other tasks in the system, enabling them to find a suitable slot at the beginning of the next hyperperiod. This enhanced priority level is used during scheduling. If the required spill is still not available after the priority level enhancement (this could be due to competing tasks which either require a spill or must start at the beginning of the hyperperiod), the allocation is upgraded. This approach is used for scheduling the second copy of task graph 1-4 in FIG. 6(*b*). Copy 2 of task graph 1-4 requires a hyperperiod spill of 10 time units. This hyperperiod spill is allocated at the beginning of the hyperperiod. Therefore, task graph 2-1 starts execution at time unit 10 instead of time unit zero and completes by time unit 16. Therefore, though copy 2 of task graph 1-4 completes at time unit 90, the resulting architecture is a feasible one due to the spill allocation at the beginning of the hyperperiod.

Figure 8A:
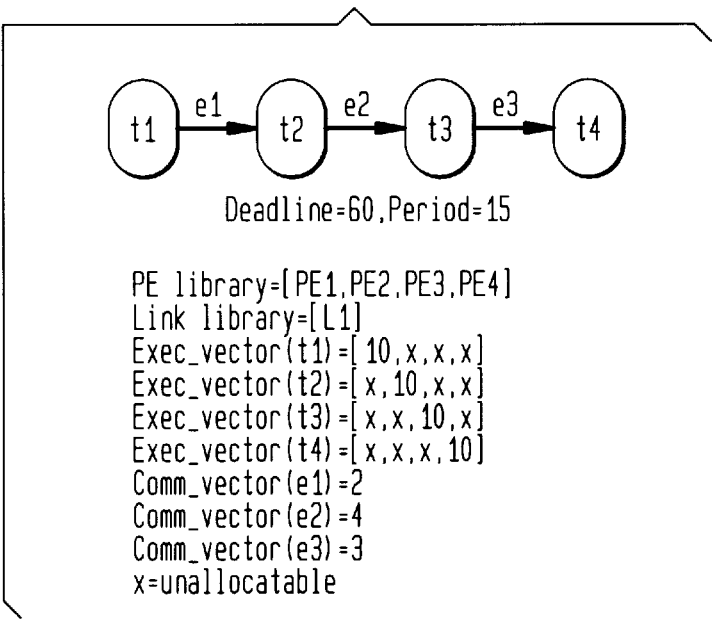
FIG. 8 shows an exemplary periodic task graph, corresponding task graph instances, and corresponding architecture and allocation, respectively, demonstrating task graph pipelining.
Figure 8B:
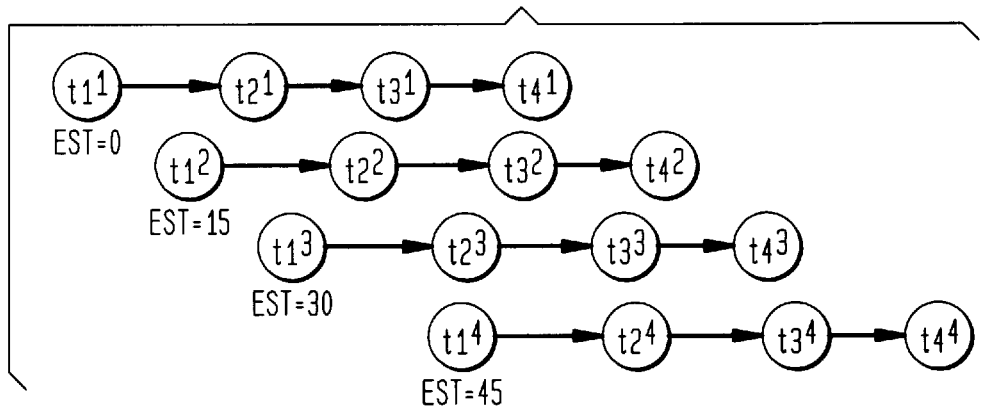
Figure 8C:
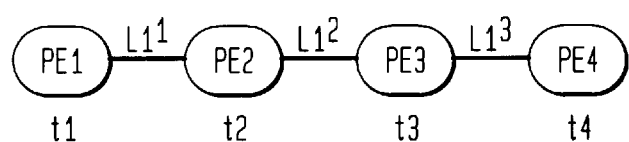

When possible, concurrent instances of task graphs are allocated to the same set of PEs and links to achieve pipelining. For example, consider the periodic task graph, resource library, and execution/communication vectors shown in FIG. 8(*a*). Since its deadline is 60 and period is 15, four concurrent instances of the task graph may be running, as shown in FIG. 8(*b*). These concurrent periodic task graphs could be allocated as shown in FIG. 8(*c*) to achieve a pipelined architecture. $LI^1$, $LI^2$ and $LI^3$ are three different instances of link L1.

2.2 Task Clustering

Clustering involves grouping of tasks to reduce the complexity of allocation. The present clustering technique addresses the fact that different paths may become the longest path through the task graph at different points in the clustering process, since the length of the longest path changes after partial clustering. The method given in Reference (17) is extended for this purpose. The present procedure also supports task graphs in which different tasks have different deadlines. In order to cluster tasks, deadline-based priority levels are first assigned to tasks and edges using the following procedure. A sink task always has a specified deadline. However, a non-sink task may either have a deadline or not. $\omega(t_j)$ is defined to be equal to the deadline of task $t_j$ if the deadline is specified, and ∞ otherwise.

a. Priority level of sink task $t_i = \alpha^{max}(t_i) - \text{deadline}(t_i)$
b. Priority level of an edge $e_k$=priority level of destination node $(e_k) + \beta^{max}(e_k)$.
c. Priority level of non-sink task $t_j$=max (priority level of its fanout edge $e_f$, $-\omega(t_j)) + \alpha^{max}(t_j)$.

As an example, the numbers adjacent to the nodes in FIG. 1(*a*) indicate their associated priority levels. The priority level of a task is an indication of the longest path from the task to a task with a specified deadline in terms of both computation and communication costs as well as the deadline. In order to reduce the schedule length, the length of the longest path is decreased by forming a cluster of tasks along the longest path. This makes the communication costs along the path zero (this is based on the traditional assumption made in distributed computing that intra-PE communication takes zero time), which helps decrease the schedule length. Then the process can be repeated for the longest path formed by the yet unclustered tasks, and so on.

In order to ensure load balancing among various PEs of the architecture, the cluster size should be limited. If the cluster size is too big, it may be prevented from being allocated to any PE. If it is too small, it would increase the total number of clusters and increase the computational complexity. A parameter called cluster size threshold, $C_{th}$, is used to limit the size of the cluster. $C_{th}$ is set equal to the hyperperiod. At any point in the clustering procedure, for any cluster $C_k$ containing m tasks $\{t_1, t_2, \ldots, t_m\}$, its size, denoted as $\theta_k$, is estimated by the following Equation (2). Let p denote the period of the tasks in cluster $C_k$ and let $\Gamma$ be the hyperperiod. Then $$\theta_k = \sum_{i=1}^{m} \alpha^{\max}(t_i) \cdot (\Gamma \div p) \quad (2)$$

FIG. 9 gives the critical-path-based clustering procedure. At the beginning, all tasks are sorted in the order of decreasing priority levels. The unclustered task $t_i$ with the highest priority level is picked and marked as clustered. Then the fan-in set of $t_i$ is found, where the fan-in set is a set of fan-in tasks that meet the following constraints: 1) the fan-in task is not clustered with another fan-out task, 2) the fan-in task's cluster $C_k$ is compatible with $t_i$, and 3) the size of cluster $C_k$ does not exceed the cluster size threshold. If the fan-in set of $t_i$ is not empty, an eligible cluster is identified and grown (i.e., expanded) using a cluster growth procedure given in FIG. 10. If the fan-in set of $t_i$ is empty, a new cluster $C_j$ is allocated, and the cluster growth procedure is used to expand it.

The cluster growth procedure adds task $t_i$ to the feasible cluster identified from the fan-in set or to a new cluster, and grows the cluster further, if possible, by adding one of the compatible fan-out tasks of $t_i$ along which the priority level of $t_i$ is the highest. The priority levels of the tasks in the task graph of $t_i$ are recomputed after clustering $t_i$ either with any existing cluster or after clustering it with one of its fan-out tasks. This allows identification of the critical path as it changes and facilitation of its compression.

Figure 11C:
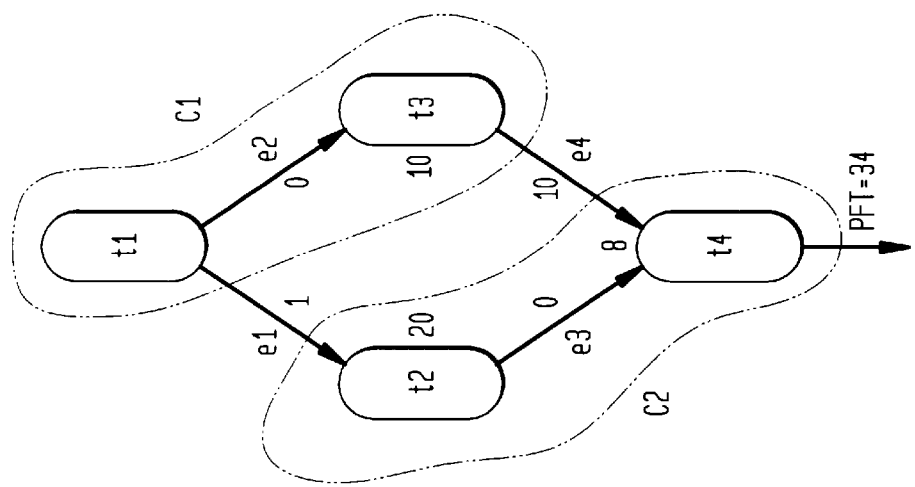
FIG. 11 shows an exemplary task graph, corresponding clustering based on fixed priority levels, and corresponding clustering based on recomputing priority levels, respectively.
Figure 11B:
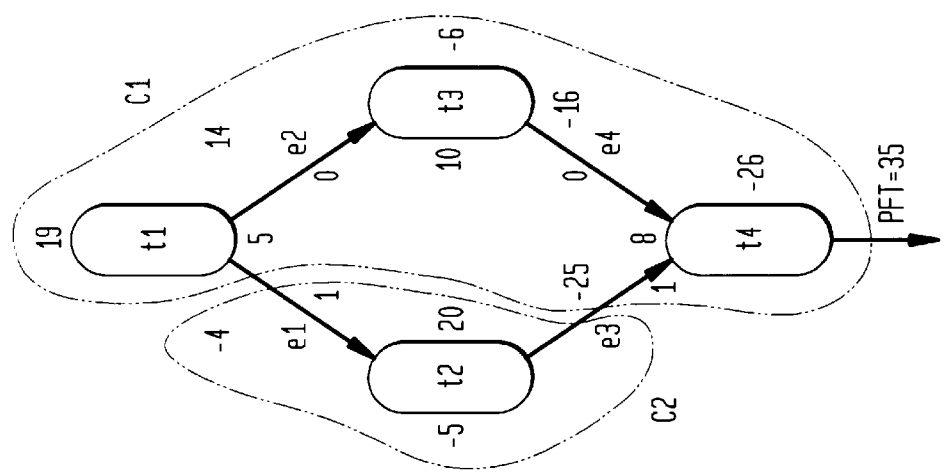
Figure 11A:
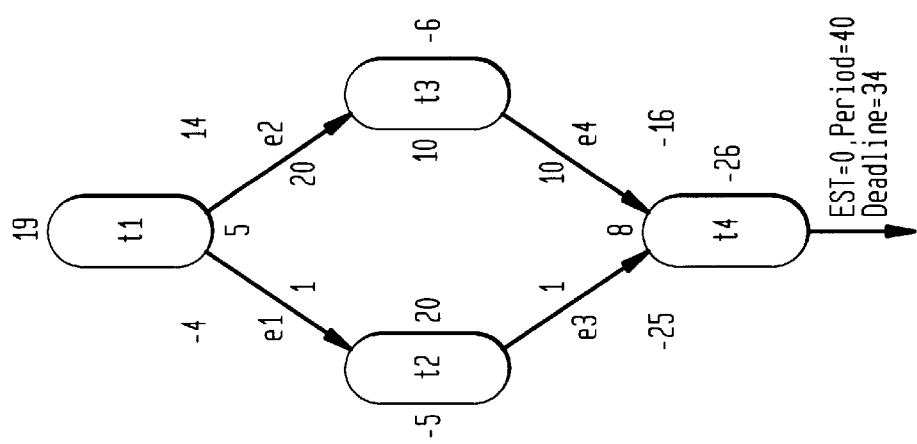

To illustrate the efficacy of the present critical-path-based clustering technique, consider the task graph in FIG. 11(a). For simplicity, assume that the resource library contains only one PE and one link. The execution time and communication time are given in non-bold numbers next to nodes and edges, respectively. The deadline of this task graph is 34. The bold numbers indicate the initial priority levels of tasks and edges. Application of the clustering procedure from Reference (17) results in two clusters, as shown in FIG. 11(b). The resulting architecture consists of two identical PEs connected with a link. The PFT with this architecture is 35. This architecture is not able to meet the deadline due to the fact that tasks $t_1$, $t_3$, and $t_4$ are clustered together. However, the present clustering procedure starts with task $t_1$ which has the highest priority level and groups it with task $t_3$ since $t_1$ has a higher priority level along the edge to task $t_3$. At this point, the communication time of edge $e_2$ is made zero and the priority levels recomputed. It is found that task $t_2$ actually has a higher priority level than task $t_3$, and, therefore, clustering starts afresh from $t_2$. The resultant clusters are shown in FIG. 11(c). The PFT is 34 with the two-PE/one-link architecture, which meets the deadline.

The application of the clustering procedure to the task graph of FIG. 1(a) results in three clusters, C1, C2, and C3, as shown in FIG. 1(d). Once the clusters are formed, some tasks are replicated in two or more clusters to address inter-cluster communication bottlenecks. See Reference (21). This is useful when the increase in computation time is less than a decrease in the communication time. For example, consider the task graph shown in FIG. 12(a). For simplicity, assume there is only one PE and one communication link in the resource library. The execution and communication times are shown next to nodes and edges, respectively, in FIG. 12(a). The application of the clustering technique described earlier in this section results in two clusters, C1 and C2 as shown in FIG. 12(b). The inter-cluster communication edge between C1 and C2 requires 20 units of communication time, which can create a communication bottleneck. In order to address this concern, we can replicate tasks t1 and t2 in cluster C2. Since the summation of the execution times of t1 and t2 is 7, which is less than the communication time of the inter-cluster edge, these two tasks are replicated, as shown in FIG. 12(c). The replicated tasks are denoted as $t1^r$ and $t2^r$. Only those tasks which are compatible with the cluster are replicated. During the allocation step, if two clusters are allocated to the same PE, then the replicated tasks are no longer needed to address the communication bottleneck(s). Therefore, they are removed from the clusters.

2.3 Cluster Allocation

Once the clusters are formed, they need to be allocated to PEs. The priority level of a cluster is defined to be the maximum of the priority levels of the constituent tasks and incoming edges. Clusters are ordered based on decreasing priority levels. After the allocation of each cluster, the priority level of each task and cluster is recalculated. The cluster with the highest priority level is selected and an allocation array is created. The allocations in the allocation array are arranged in the order of increasing value of the cost function. Once the allocation array is formed, the inner loop of co-synthesis is used to evaluate the allocations.

An allocation array is an array of the possible allocations for a given cluster at that point in co-synthesis. Such an array is created using the procedure given in FIG. 13. Architectural hints are used to pre-store allocation templates. These templates correspond to the mapping of sub-task-graphs to part of the architecture being built, as explained in Section 1. Only two new PEs and links are allowed to be added at any allocation step in order to keep the size of the allocation array at manageable levels. During allocation array creation, for each allocation, checks are made for signal compatibility (5 V CMOS-3.3 V CMOS, CMOS-TTL, etc.), and voltage translation buffers are added, as necessary. See References (22)–(24). Excluded are those allocations for which the pin count, gate count, communication port count, memory limits, and/or peak power dissipation are exceeded. The allocations in the array are ordered based on dollar cost. If power is being optimized, the ordering is done based on average power dissipation.

Once the allocation array is formed, all allocations are marked as unvisited. In one embodiment, the unvisited allocation with the least dollar cost is picked as the next selected allocation for performance evaluation and marked as visited, followed by the scheduling, performance estimation, and allocation evaluation steps described next. In an alternative embodiment, the next allocation is selected based on the results of evaluating the performance of the previous allocation. Before selecting the next allocation in the allocation array, a preliminary check is made on the next allocation to see whether it has sufficient resources, in light of the results of the performance evaluation of the previous allocation. If the next allocation does not have sufficient resources, then that allocation is not explored further and processing skips to the subsequent allocation.

2.4 Scheduling

A priority-level-based static scheduler is used for scheduling tasks and edges on all PEs and links in the allocation.

Figure 15A:
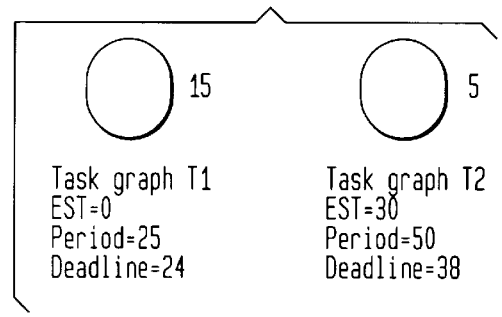
FIG. 15 shows exemplary task graphs, corresponding processing element (PE) library, a corresponding non-preemptive schedule, and a corresponding preemptive schedule, respectively.
Figure 15B:
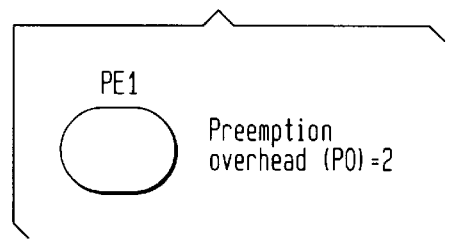
Figure 15C:
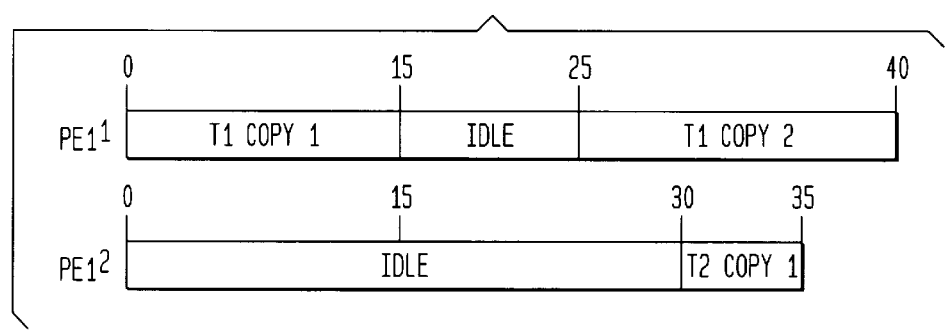

In general, only the first copy of the task is scheduled. The start and finish times of the remaining copies are updated in the association array, as discussed earlier. Usually, this is sufficient to derive an efficient architecture. However, sometimes some of the remaining copies need to be scheduled. A combination of preemptive and non-preemptive static scheduling is employed. The present scheduler schedules both the tasks allocated to general-purpose processors as well as the communications on links. The procedure outlined in FIG. 14 is used to schedule tasks and edges. First, the copies of tasks that require a hyperperiod spill are identified, and the hyperperiod is added to their priority levels. To determine the order of scheduling, tasks and edges are ordered based on the decreasing order of their priority levels. If two tasks (edges) have equal priority levels, then the task (edge) with the shorter execution (communication) time is scheduled first. While scheduling communication edges, the scheduler considers the mode of communication (sequential or concurrent) supported by the link and processor. Though preemptive scheduling is sometimes not desirable due to the overhead associated with it, it may be necessary to obtain an efficient architecture. Consider the task graphs in FIG. 15(a). FIG. 15(b) shows the PE library. The numbers next to the tasks in FIG. 15(a) denote their execution time on the sole PE type available. The link library is not shown as there are no edges in this example. The hyperperiod of the task graphs is 50. There are two copies of task graph 1 in the hyperperiod. The priority levels of copy 1 and 2 of task graph 1 are −9 and −34, respectively. The priority level of task graph 2 is −33. Since task graph 1, copy 1, has the higher priority, this copy is scheduled and the association array is used to derive the schedule for copy 2. The resulting schedule is shown in FIG. 15(c). Next, task graph 2 needs to be scheduled. Since task graph 2 can start at time 30 and needs to finish by time 38, it is not possible to schedule it on PE1 since copy 2 of task graph 1 is already scheduled during this time on PE1. Therefore, another PE is required and the resulting schedule is also shown in FIG. 15(c). In order to avoid adding an extra PE, copy 2 of task graph 1 is preempted, since its priority level is lower than that of task graph 2. In order to decide whether to preempt or not, the following criteria are used. Let $\phi_i$ and $\angle_j$ be the priority levels of tasks $t_i$ and $t_j$, respectively, and let $\alpha_{ir}$ and $\alpha_{jr}$ be their execution times on PEr. Let $\eta_r$ be the preemption overhead (PO) on PEr to which tasks $t_i$ and $t_j$ are allocated. Let $\pi^b(t_i)$ be the best-case finish time (this takes $\alpha_{ir}$ into account) and $\mu(t_i)$ be the deadline of task $t_i$. Preemption of task $t_i$ by $t_j$ is allowed under the following scenarios.

Preemption Condition 1: $\phi_j > \phi_i$, or

Preemption Condition 2: $t_i$ is a sink task, and $\pi_b(t_i) + \eta_r + \alpha_{jr} \leq \mu(t_i)$.

Figure 15D:
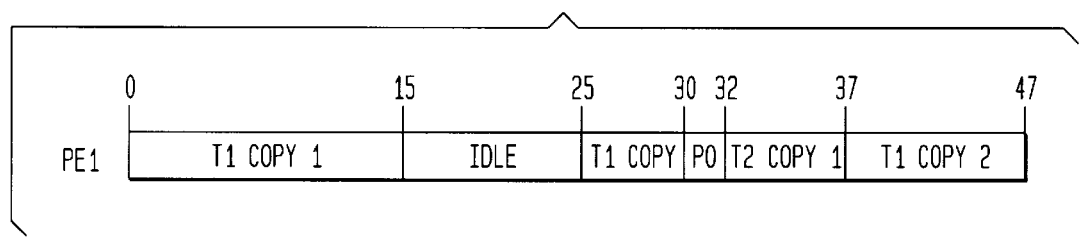

The preemption overhead, $\eta_r$, is specified a priori. It includes context switching and any other processor-specific overheads. Preemption of a higher priority task by a lower priority task is allowed only in the case when the higher priority task is a sink task which will not miss its deadline, in order to minimize the scheduling complexity. This is important since scheduling is in the inner loop of co-synthesis. In this example, the preemption overhead for PE1 is assumed to be 2. The resulting architecture requires only one PE. Its associated schedule is shown in FIG. 15(d). Architectural hints are checked for each task before allowing preemption, since an embedded system specification may require that some critical tasks not be preempted irrespective of their priority levels.

Next, consider the more complex example shown in FIG. 16(a). The specification consists of periodic task graphs T1 and T2. Suppose that the PE library consists of three PEs (PE1, PE2, PE3) and the link library consists of a single link (L1). The execution and communication vectors for different tasks and edges on members of the resource library are also shown in FIG. 16(a). The hyperperiod of the two task graphs is 50. Therefore, one copy of task graph T1 and two copies of task graph T2 need to be executed in the hyperperiod. Application of the clustering technique groups tasks t1 and t2 together. ESTs of various copies of task graphs are shown in FIG. 16(b). The two copies of T2 are labeled T2$^1$ and T2$^2$. The constituent tasks and edges of T2 are similarly labeled. This figure also shows a feasible architecture along with the task and edge allocation. L1$^1$, L1$^2$ and L1$^3$ are three instances of link L1. FIG. 16(c) shows the PE/link schedule for this architecture. The schedule for T2$^2$ is derived from the schedule of T2$^1$ using the association array concept discussed earlier.

2.5 Performance Estimation

In real-time systems, all task graphs need to meet their deadlines. The finish-time estimation step is used, employing the longest path algorithm, to estimate the finish times of all tasks with specified deadlines and check whether their deadlines are met. For power optimization, in addition to the finish time, the overall energy and power consumptions are also estimated in this step.

The scheduler provides accurate information on the start and finish times of the tasks in the allocated clusters. This, in turn, makes the finish-time estimation method more accurate and minimizes the false rejection of an allocation. The best- and worst-case start as well as finish times of each task and edge are stored. Each node (communication edge) in the task graph has the minimum and maximum entries in the corresponding execution (communication) vector associated with it. When a task (edge) gets allocated, its minimum and maximum execution (communication) times become equal and correspond to the execution (communication) time on the PE (link) to which it is allocated, as shown in FIG. 1(d) (here cluster C1 is assumed to be mapped to PE2). The finish-time estimation step, after each scheduling step, updates the best- and worst-case finish times of all tasks and edges. This is done as follows. Let $\pi^b$ and $\pi^w$ represent best- and worst-case finish times, respectively. The best- and worst-case finish times for a task and edge are estimated using the following equations:

$$\pi^b(t_i) = \max\{\pi^b(e) + \alpha^{min}(t_i)\}$$

$$\pi^w(t_i) = \max\{\pi^w(e) + \alpha^{max}(t_i)\}$$

$$\pi^b(e_j) = \pi^b(t_k) + \beta^{min}(e_j)$$

$$\pi^w(e_j) = \pi^w(t_k) + \beta^{max}(e_j)$$

where $e \in \{E\}$, the set of input edges of $t_i$ and $t_k$ is the source node of edge $e_j$.

The above finish-time estimation method is next applied to the task graph of FIG. 1(a). Suppose cluster C1 is allocated to PE2, as mentioned before. In that case, the finish-time estimation (FTE) graph of FIG. 1(c) would be obtained, which indicates that the best- and worst-case finish times of sink task t11 are 150 and 200, respectively.

2.6 Allocation Evaluation

Each allocation is evaluated based on the total dollar cost. The allocation is picked which at least meets the deadlines in the best case. If no such allocation exists, an allocation is picked for which the summation of the best-case finish times of all task graphs is maximum. The best-case finish time of a task graph is the maximum of the best-case finish times of the constituent tasks with specified deadlines. This generally leads to a less expensive architecture, since a larger finish time generally corresponds to a less expensive architecture. If there are more than one allocation which meet this criterion, the allocation is chosen for which the summation of the worst-case finish times of all task graphs is maximum. The reason behind using the "maximum" instead of "minimum" in the above cases is that, at intermediate steps, it is desirable to be as frugal as possible with respect to the total dollar cost of the architecture. If deadlines are not met, there is always the choice of upgrading the architecture at a later step.

2.7 Support of Multiple Supply Voltages

The present co-synthesis algorithm supports a resource library in which different PEs require different supply voltages, such as 5 V, 3.3 V, 2.7 V, −5.2 V, etc. This is crucial for the following reasons: 1) it allows mixing of different technologies, e.g., 5 V CMOS, 3.3 V CMOS, 2.7 V CMOS, TTL, ECL, etc., and 2) it allows the derivation of power-efficient architectures by taking advantage of state-of-the-art low-power technology. Support of multiple supply voltages poses the following challenges: 1) it requires checking of signal voltage level compatibility for each communication link/PE interface, 2) it requires the inclusion of voltage level translation buffers in the architecture, and 3) it requires estimation of power requirements for multiple voltage levels. Buffers for voltage level translation have been described in References (22)–(24). During the generation of the allocation array, a translation buffer is added, if necessary, between any two PEs that operate at different voltages. The power dissipation for the translation buffer is then calculated during the performance estimation stage. The power dissipation in such a buffer is computed considering its average quiescent power dissipation, frequency of operation of the communicating link, and the activity factor of the signal. Activity factor defines the effective transition rate of the signal. For example, a serial link with separate data and clock signals can have a clock frequency of 10 MHz. However, its data signal transition rate is determined by multiplying its clock frequency with its activity factor. The latter is determined a priori considering the type of data being communicated. See References (22)–(24). The communication time for that link between two PEs is modified considering the transmission delay of the translation buffer.

2.8 Power Distribution Architecture

Once the embedded system architecture meeting all specified constraints has been derived, the power distribution architecture is derived. This defines the power supply capacity and the interconnection of various power converters to meet the power requirements of the embedded system. An embedded system architecture can be represented by an architecture graph, whose nodes and edges represent PEs and links, respectively. Power distribution architecture derivation is formulated as a graph partitioning problem. See Reference (25). The architecture graph is partitioned into several sub-graphs. Each sub-graph forms a module, which is a group of PEs and links. The present graph partitioning algorithm employs concepts from: 1) the Kernighan and Lin graph partitioning algorithm, and 2) the maximal independent set formation algorithm. See Reference (26). It partitions the architecture graph such that the number of inter-connections (i.e., the summation of the number of signals for each inter-module link) between modules is minimized, while not exceeding the total power dissipation threshold for each module. This threshold is determined and given a priori to the present algorithm, considering the target system application and physical size of the printed circuit board used for each module. The algorithm attempts to minimize the number of interconnections between modules, rather than strictly balance power dissipation among modules, since the present approach reduces the load capacitance of the communication links and supports the ultimate goal of power optimization by reducing power dissipation on each link. During graph partitioning, the algorithm attempts to keep the heavily communicating PEs together in the same sub-graph. The power distribution architecture for each module is defined considering its power supply requirement. For each module, the peak power dissipation requirements for constituent PEs and links are summed for the respective supply voltage levels, such as 5 V, 3.3 V, 2.7 V, etc. The external supply voltage of an embedded system is generally much higher than the supply voltage required by the constituent PEs of the architecture. For example, in case of telecom systems, the external supply voltage is usually −48 V (North American applications) or −72 V (European applications). Based on the embedded system peak power dissipation requirement, external supply voltage, and power supply noise limitations, the power converter and associated circuitry (fuse, diode-ORing networks, filter, Ferrite beads, etc.) is chosen to derive the power distribution architecture and the required circuitry for each module. See Reference (27).

To illustrate the above approach, consider the architecture graph shown in FIG. 17(a). For simplicity, assume that each module requires only two power supply voltages, say 5 V and 3.3 V. PEs requiring 5 V supply are indicated by dashed boxes. TB refers to the voltage translation buffer. The peak power dissipation requirement for each PE is shown in the respective box. The peak power dissipation for each link is simply shown next to it. The architecture graph is partitioned into two modules, Module 1 and Module 2, as indicated by the enclosures in FIG. 17(a), such that the number of interconnections between modules is minimized. The power dissipation requirement is computed for each supply voltage by summing up the peak power dissipation requirements of constituent PEs and links. For simplicity, the power dissipation of each inter-module link is added to both modules. Similarly, the power dissipation of a link between two PEs operating at different supply voltages, is added to the power requirement of both supply voltages. The total power requirement for Module 1 is computed to be 10.26 W @ 3.3 V and 2.58 W @ 5 V. Similarly, the total power requirement for Module 2 is computed to be 9.94 W @ 3.3 V and 4.14 W @ 5 V. Next, each module is augmented with the power converters needed to meet its power requirements, as shown in FIGS. 17(b) and 17(c). While adding the power converter, the required diode-ORing networks are also added to provide an interface to the redundant −48 V source as well as the fuse and power supply noise filter blocks. Diode-ORing of two −48 V buses (A & B) is performed to provide uninterrupted power source in the event of failure of one of the −48 V buses. The fuse rating is determined based on total power dissipation and the power converter efficiency rating. See Reference (27).

2.9 Application of the Co-Synthesis Algorithm

Figure 18A:
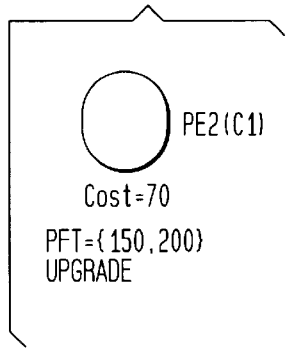
FIG. 18 shows a set of steps through the co-synthesis process, according to one embodiment of the present invention.

The present co-synthesis algorithm is next applied to the task graph of FIG. 1(a). As mentioned before, the clustering procedure results in three clusters, as shown in FIG. 1(d). The clusters are then ordered based on the decreasing value of their priority levels. FIG. 18 illustrates the allocation of various clusters during the outer and inner loops of co-synthesis. Since cluster C1 has the highest priority level, it is allocated first to the cheaper processor PE2, as shown in FIG. 18(a). The scheduler is run and the PFT of the task graph is estimated to be {150, 200}, as shown in FIG. 1(d).

Figure 18B:
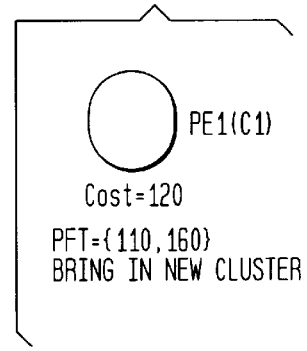
Figure 18C:
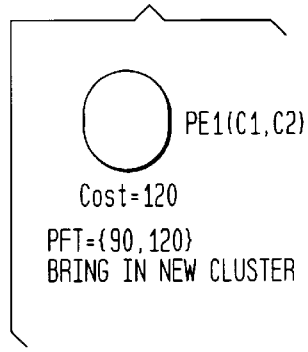
Figure 18D:
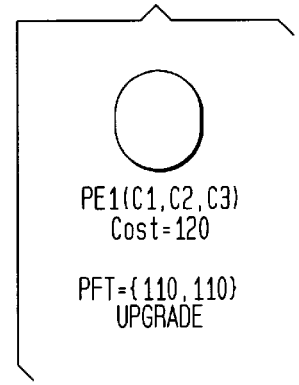
Figure 18E:
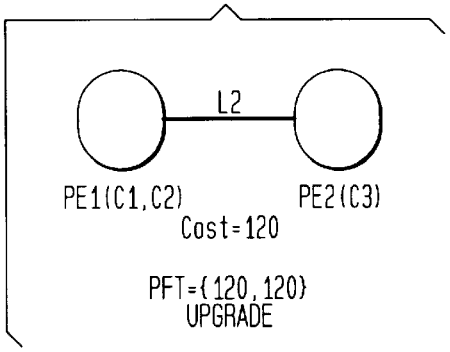
Figure 18F:
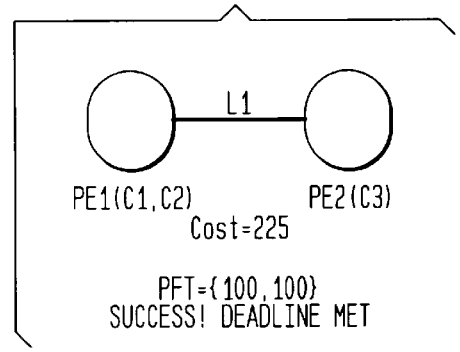

Since the best-case estimated finish time does not meet the deadline, the partial architecture needs to be upgraded. Therefore, C1 is allocated to processor PE1, as shown in FIG. 18(b). Since the deadline is still not met and all possible allocations are explored, cluster C1 is marked as allocated and cluster C1 is considered for allocation. First, an attempt is made to allocate cluster C2 to the current PE, as shown in FIG. 18(c). After scheduling, the finish-time estimation step indicates that the deadline can be met in the best case. Hence, cluster C3 is considered for allocation next. Again, an attempt is first made to allocate cluster C3 to PE1, as shown in FIG. 18(d). Since the deadline is not met in the best case, the architecture needs to be upgraded, as shown in FIG. 18(e). Since the deadline is still not met, the architecture is upgraded again, as shown in FIG. 18(f). Now that the deadline is met and all clusters are allocated, the architecture given in FIG. 18(f) is the final solution.

3 Co-Synthesis of Low Power Distributed Embedded Systems

For some embedded systems, along with cost and real-time constraints, another important consideration is power dissipation. This section describes the co-synthesis system for low power called COSYN-LP.

The basic co-synthesis process flow outlined in FIG. 2 is also used in COSYN-LP. The parsing and association array formation steps remain the same as before. The following describes how the other steps are modified. Once the architecture is defined, the power distribution architecture of the system is determined and the required power supply converters are added.

3.1 Task Clustering

Deadline-based priority levels are used to choose a task for clustering. However, once the task is picked, it is grouped with a task along which it has the highest energy level, instead of priority level, to form clusters, since the present objective is to minimize overall power consumption. Clustering along the higher energy-level path makes the communication time as well as communication energy for inter-task edges zero. The concept of energy levels also enables taking into account the quiescent energy dissipation in PEs and links in a straightforward manner. This is the reason energy levels are targeted even though the present ultimate goal is to minimize average power dissipation subject to the given real-time and peak power constraints.

Energy levels are assigned using the following procedure.
1. For each task $t_i$ (edge $e_j$), determine the average energy dissipation, as $\alpha^{max}(t_i)(\beta^{max}(e_j))$ multiplied by the average power dissipation on the corresponding PE (link). $\alpha^{max}(t_i)$ and $\beta^{max}(e_j)$ are chosen because meeting real-time constraints is most important. Mark all tasks as unvisited.
2. For each unvisited task $t_i$ in the task graph, do the following:
   a. If $t_i$ is a sink task, energy level $(t_i)$={average energy of task $t_i$}. Mark $t_i$ visited.
   b. If $t_i$ is not a sink task, for each edge $e=(t_i,t_f)$ in the set of fan-out edges of task $t_i$, where $t_f$ is a fan-out task, energy level $(t_i)$=max (energy level $(t_f)$+average energy $(t_i,t_f)$+average energy $(t_i)$). Mark $t_i$ as visited.

The cluster formation procedure is the same as the one given in Section 2.2, except for the fact that energy levels are used instead of priority levels. The energy levels are recomputed after the clustering of each node. Once clustering is done, some tasks are replicated in more than one cluster to eliminate inter-cluster communication bottlenecks as before. See Reference (21). To appreciate the difference between the energy-level-based clustering and the one given in Section 2.2, consider the task graph shown in FIG. 19(a). The numbers in brackets in this figure indicate initial energy levels and the numbers in bold indicate initial priority levels. They have been derived from the vectors given in FIG. 19(f). Application of COSYN results in two clusters C1 and C2, as shown in FIG. 19(b), and the architecture shown in FIG. 19(c). Here, for simplicity, only one PE and link are assumed to be present in the PE and link libraries, whose costs are shown in FIG. 19(c). COSYN-LP results in a different clustering, as shown in FIG. 19(d). The resulting architecture from COSYN-LP is shown in FIG. 19(e). COSYN-LP results in a reduction in overall energy consumption from 60 to 55.25 with a minor increase in the finish time while still meeting the deadline. Here, for simplicity, it is assumed that the quiescent power dissipation in the PEs/links is zero. However, in general, this is taken into account, as explained later in this specification.

The energy-level-based clustering technique generally does not result in a significant increase in the schedule length. This is due to the fact that energy and schedule length optimization are not necessarily divergent goals. See Reference (28).

3.2 Cluster Allocation

Cluster allocation and finish-time/power estimation in the outer and inner loops of co-synthesis are discussed next. In the outer loop of co-synthesis, the allocation array is created, as before, for each cluster, and each allocation is checked to see if the peak power dissipation as well as memory capacity (in case of general-purpose processor) of the associated PE/link is exceeded. To each link of the allocation, the required voltage translation buffer is added if needed. Entries in the allocation array are ordered based on increasing average power dissipation. If there are more than one allocation with equal average power dissipation, then the allocation with the least dollar cost is chosen. Further ties are broken based on peak power dissipation.

In the inner loop of co-synthesis, in addition to finish time estimation, architecture energy/power estimation is also performed. The peak power dissipation, average energy dissipation, and average power dissipation for each processor, FPGA, ASIC, and communication link in the architecture are estimated as follows.

Processor/link: The average and peak power are estimated based on the tasks (edges) allocated to the processor (link). The quiescent power dissipation of a processor (link) indicates the power dissipation during the idle time when no task (edge) is assigned to it. The power dissipation of a task (edge) is obviously higher than the quiescent power dissipation of a processor (link). Let $t_i \in \{T\}$ be the set of tasks assigned to the pth processor P. Similarly, let $e_j \in \{E\}$ be the set of communication edges assigned to the lth link L. The peak power for P is max{peak power $(t_i \in \{T\})$}. Similarly, the peak power for L is max {peak power$(e_j \in \{E\})$}. These peak power numbers are compared against the peak power constraints specified for the PE and link to make sure they are not exceeded. Let $\Re^\xi$ represent the average energy, and let $\theta^\xi$ represent the quiescent average power dissipation, respectively. Let $\psi$ represent the idle time in the hyperperiod. Let $n_i(n_j)$ be the number of times that task $t_i$ (edge $e_j$) is executed in the hyperperiod. The average energy for P and L is estimated using the following equations:

$$R^\xi(P) = \left[\sum_{t_i \in T} \xi_{ip} \cdot \alpha_{ip} \cdot n_i\right] + [\theta^\xi(P) \cdot \psi(P)]$$

$$R^\xi(L) = \left[\sum_{e_j \in E} \xi_{jt} \cdot \beta_{jt} \cdot n_j\right] + [\theta^\xi(L) \cdot \psi(L)]$$

The average power dissipation of P and L is estimated by dividing the corresponding total average energy dissipation by the hyperperiod.

FPGA/ASIC: Tasks assigned to FPGAs and ASICs can run simultaneously. Therefore, the peak power of an FPGA/ASIC is the summation of the peak power required by all tasks assigned to them and the quiescent power of the unused portion of the FPGA/ASIC. The average energy/power estimation procedure is similar to the one given above.

System power dissipation: The average power dissipation of the partial architecture is estimated by dividing the total estimated energy dissipated in PEs/links in it by the hyperperiod.

During the allocation evaluation step, the allocation is picked which at least meets the deadline in the best case. If no such allocation exists, an allocation is picked for which the summation of the best-case finish times of the nodes with specified deadlines in all task graphs is maximum, similar to COSYN.

4 Experimental Results

The present co-synthesis algorithms, COSYN and COSYN-LP, are implemented in C++. Table 1 provides an overview of the examples from the literature on which COSYN was run. Prakash & Parker(0–4) are from Reference (11). Prakash & Parker(0) is the same as task 1 in Reference (11). Prakash & Parker(1–3) are the same as task 2 in Reference (11) with different constraints. Prakash & Parker(4) is a combination of task 1 and task 2 from Reference (11). Yen & Wolf Ex is from Reference (14). Hou & Wolf Ex(1,2) are from Reference (15). DSP is from Reference (21) and its deadline and period were assumed to be 6500 ms. The PE and link libraries used in these results are the same as those used in the corresponding references. COSYN and COSYN-LP were also ran on various Bell Laboratories telecom transport system task graphs. These are large task graphs representing real-life field applications. The execution times and power dissipation for the tasks in the transport system task graphs were either experimentally measured or estimated based on existing designs. The general-purpose processors in the resource library had the real-time operating system, pSOS+, running on them. The execution times included the operating system overhead. For results on these graphs, the PE library was assumed to contain Motorola microprocessors 68360, 68040, 68060 (each processor with and without a second-level cache), 11 ASICs, one XILINX 3195A FPGA, and one ORCA 2T15 FPGA. The link library was assumed to contain a 680X0 bus, a 10 Mb/s LAN, and a 31 Mb/s serial link. As shown in Table 2, COSYN consistently outperforms both MILP and iterative improvement techniques. See References (11), (14), and (15). For example, for Prakash & Parker (4), the MILP technique required approximately 107 hours of CPU time on Solbourne5/e/900, and Yen and Wolf's algorithm was unable to find a solution, whereas COSYN was able to find the same optimal solution as MILP in less than a second on Sparcstation 20 with 256 MB RAM.

Results in Tables 3–6 show that COSYN was also able to handle the large telecom transport system task graphs efficiently. Note that even architectures with the same number of PEs and links can have different cost because of different PEs/links that may have been used. Also, two architectures with equal cost and the same number and type of PEs and links can still have different power dissipation, since they may employ different schedules with different number of preemptions. Table 3 shows the efficacy of the association array concept (in this table, for both versions of COSYN, task clustering was used). Utilization of this concept reduces CPU time by an average of 81% (this is the average of the individual reductions; the average is similarly determined for other parameters) at an average increase of 0.8% in embedded system cost. Table 4 shows the efficacy of the present clustering technique over no clustering (in this table, for both versions of COSYN, the association array concept was used). Utilization of task clustering reduces CPU time by an average of 59% at an average increase of 0.9% in embedded system cost. Table 5 shows the joint efficacy of the association array and clustering techniques. The combination of the association array concept and task clustering results in an average reduction of 88% in CPU time at an average increase of 1.4% in embedded system cost. This enables the application of COSYN to very large task graphs. However, since CPU time is not a big concern for smaller task graphs with a well-behaved hyperperiod, flags have been provided in the present co-synthesis system to allow the user to bypass association array formation or task clustering or both. Table 6 shows the importance of using a resource library which includes PEs operating at different supply voltages. While using a resource library with only 5 V PEs, the architecture was not feasible for examples BETS3 and BCS since some of the associated tasks required PEs with different supply voltages. Support of multiple supply voltages results in an average reduction of 33.4% in power dissipation and 12% in embedded system cost.

Table 7 compares COSYN with COSYN-LP. COSYN-LP was able to reduce power dissipation by an average of 19.6% over the basic COSYN algorithm at an average increase of 13.9% in embedded system cost. Note that for the results given in this table, both COSYN and COSYN-LP were supplied with a resource library with PEs operating at different supply voltages. Also, as shown in the last column of Table 7, the actual system power measurements made on the COSYN-LP architectures indicate that the error of the COSYN-LP power estimator is within 8%.

The COSYN and COSYN-LP systems that achieved the experimental results described above were based on experimental software versions having many debug statements. As such, even further improvements in CPU time could be achieved by optimizing the code for performance.

5 Conclusions and Areas of Further Investigation

An efficient distributed system co-synthesis algorithm is presented in this specification. Even though it is a heuristic algorithm, experimental results show that it produces optimal results for the examples from the literature. It provides several orders of magnitude advantage in CPU time over existing algorithms. This enables its application to large examples for which experimental results are very encouraging. Large real-life examples have not been tackled previously in the literature. Also presented is the first co-synthesis algorithm for power optimization.

In the COSYN and COSYN-LP systems, the task clustering procedure takes into account the dynamic nature of the critical path. One general feature of the dynamic-critical-path-based task clustering of the present invention is that task clustering is performed without requiring completion of one cluster before moving on to start another cluster.

In the COSYN system, priority levels are used to determine (1) the order in which tasks are selected for clustering and (2) how the selected task is grouped with other tasks. In the COSYN-LP system, priority level is used to select the next task for clustering, but energy level is used to determine how the selected task is to be grouped with other tasks. In alternative embodiments of the present invention, the cost function used to order tasks for clustering and/or to group selected tasks into clusters can be based on cost functions other than priority level or energy level, such as execution time or any other acceptable cost function.

In the COSYN and COSYN-LP systems, priority levels are recalculated after each task is selected and grouped during task clustering. In alternative embodiments, priority levels need not be recalculated.

REFERENCES

The following references are incorporated herein by reference:

(1) M. R. Garey and D. S. Johnson, Computers and Intractability: A Guide to the Theory of NP-Completeness, W. H. Freeman and Co., 1979.

(2) Y.-K. Kwok, and I. Ahmad, "Dynamic critical-path scheduling: An effective technique for allocating task graphs to multiprocessors," IEEE Trans. Parallel & Distributed Systems, vol. 7, pp. 506–521, May 1996.

(3) R. K. Gupta, Hardware-Software Co-Synthesis of Digital Systems, Ph.D. thesis, EE Dept., Stanford University, 1994.

(4) R. Ernst, J. Henkel and T. Benner, "Hardware-software co-synthesis for microcontrollers," IEEE Design & Test of Computers, vol. 10, no. 4, pp. 64–75, December 1993.

(5) F. Vahid, J. Cheng and D. D. Gajski, "A binary-constraint search algorithm for minimizing hardware during hardware/software partitioning," in Proc. European Design Automation Conf., pp. 214–219, September 1994.

(6) E. Barros, W. Rosenstiel and X. Xiong, "A method for partitioning UNITY language to hardware and software," in Proc. European Design Automation Conf., pp. 220–225, September 1994.

(7) A. Jantsch, P. Ellervee, J. Oberg, A. Hermani, and H. Tenhumen, "Hardware/software partitioning and minimizing memory interface traffic," in Proc. European Design Automation Conf., pp. 226–231, September 1994.

(8) A. Kalavade and E. A. Lee, "A hardware-software codesign methodology for DSP applications," IEEE Design & Test of Computers, vol. 10, no. 3, pp. 16–28, September 1993.

(9) A. Kalavade and E. A. Lee, "A global criticality/local phase driven algorithm for constrained hardware/software partitioning problem," in Proc. Int. Wkshp. Hardware-Software Co-Design, pp. 42–48, September 1994.

(10) W. Wolf, "Hardware-software co-design of embedded systems," Proc. IEEE, pp. 967–989, July 1994.

(11) S. Prakash and A. Parker, "SOS: Synthesis of application-specific heterogeneous multiprocessor systems," J. Parallel & Distributed Comput., vol. 16, pp. 338–351, December 1992.

(12) J. G. D'Ambrosio and X. Hu, "Configuration-level hardware/software partitioning for real-time systems," in Proc. Int. Wkshp. Hardware-Software Co-Design, pp. 34–41, September 1994.

(13) T.-Y. Yen and W. Wolf, "Performance estimation for real-time distributed embedded systems," in Proc. Int. Conf. Computer Design, pp. 64–69, October 1995.

(14) T.-Y. Yen and W. Wolf, "Communication synthesis for distributed embedded systems," in Proc. Int. Conf. Computer-Aided Design, pp. 288–294, November 1995.

(15) J. Hou and W. Wolf, "Process partitioning for distributed embedded systems," in Proc. Int. Wkshp. Hardware/Software Co-design, pp. 70–76, September 1996.

(16) D. Kirovski and M. Potkonjak, "System-level synthesis of low-power real-time systems," in Proc. Design Automation Conf., pp. 697–702, June 1997.

(17) S. Srinivasan and N. K. Jha, "Hardware-software co-synthesis of fault-tolerant real-time distributed embedded systems," in Proc. European Design Automation Conf., pp. 334–339, September 1995.

(18) E. Lawler and C. Martel, "Scheduling periodically occurring tasks on multiple processors," Information Processing Letters, vol. 12, February 1981.

(19) S. Kim and J. Browne, "A general approach to mapping of parallel computations upon multiprocessor architectures," in Proc. Int. Conf. Parallel Processing, pp. 1–8, August 1988.

(20) G. Sih and E. Lee, "A compile-time scheduling heuristic for interconnection constrained heterogeneous processor architectures," IEEE Trans. Parallel & Distributed Systems, vol. 4, pp. 175–186, February 1993.

(21) S. Yajnik, S. Srinivasan and N. K. Jha, "TBFT: A task based fault tolerance scheme for distributed systems," in Proc. ISCA Int. Conf. Parallel & Distr. Comput. Syst., pp. 483–489, October 1994.

(22) M. McClear, "Low-cost, low-power level shifting in mixed-voltage systems," Application Notes, SCBA002, Texas Instruments, 1996.

(23) R. Boylestad and L. Nashelsky, Electronic Devices and Circuitry Theory, Prentice-Hall, 1978.

(24) Motorola, Inc., Microprocessors Users Manual, 1996.

(25) N. Deo, Graph Theory with Applications to Engineering and Computer Science, Prentice-Hall, 1994.

(26) G. De Micheli, Synthesis and Optimization of Digital Circuits, McGraw Hill, 1994.

(27) E. C. Jordan, Reference Data for Engineers: Radio, Electronics, Computer, and Communications, Howard W. Sams & Co., Inc., 1985.

(28) V. Tiwari, S. Malik and A. Wolfe, "Compilation techniques for low energy: An overview," in Proc. Symp. Low-Power Electronics, October 1994.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method for designing the architecture of an embedded system, comprising:

(a) a pre-processing phase comprising the steps of:

(1) parsing one or more task graphs, one or more system/task constraints, and a resource library for the embedded system, wherein the embedded system has two or more instances of at least one task graph; and (2) generating an association array for the task graphs, wherein the association array stores a limited amount of information for each instance of a task graph of the embedded system to avoid replication of a full description for each task graph having two or more instances and its associated parameters; and (b) a synthesis phase, following the pre-processing phase, comprising the step of allocating one or more groups of one or more tasks in the tasks graphs to one or more processing elements (PEs) in the resource library and allocating one or more edges in the tasks graphs to one or more communication links in the resource library, based on performance evaluation of one or more possible allocations for each of the groups and edges in light of the system/task constraints, wherein the performance evaluation uses the association array.

2. The method of claim 1, wherein the pre-processing phase further comprises the step of defining a hyperperiod for the embedded system, wherein the association array stores the limited amount of information for each instance of a task graph of the embedded system in the hyperperiod.

3. The method of claim 2, wherein the hyperperiod is based on modified task graph periods that reduce the hyperperiod.

4. The method of claim 2, wherein the hyperperiod comprises hyperperiod spill to account for a task graph that does not complete within the hyperperiod, wherein the hyperperiod spill is allocated at the beginning of the hyperperiod.

5. The method of claim 1, wherein, for each instance, the limited amount of information comprises a PE instance, an earliest start time, a deadline, a priority level, a best-case projected finish time (PFT), and a worst-case PFT.

6. The method of claim 5, wherein the deadline of the nth instance of a task graph is offset from the deadline of the first instance of the task graph by (n−1) multiplied by the period of the task graph.

7. The method of claim 1, wherein different instances of the task graph are distributed to different PEs, thereby enabling concurrent execution of the different instances in a pipelined manner.

8. The method of claim 1, wherein the task graph has a deadline greater than its period and the association array is a two-dimensional array, one dimension corresponding to consecutive execution of different instances of the task graph and the other dimension corresponding to concurrent execution of different instances of the task graph.

9. An embedded system having an architecture generated using the method of claim 1.

10. A method for designing the architecture of an embedded system, comprising:
  (a) a pre-processing phase comprising the steps of:
    (1) parsing one or more task graphs, one or more system/task constraints, and a resource library for the embedded system; and
    (2) defining a hyperperiod for the embedded system, wherein the hyperperiod comprises hyperperiod spill to account for one or more task graphs that do not complete within the hyperperiod, wherein the hyperperiod spill is allocated at the beginning of the hyperperiod; and
  (b) a synthesis phase, following the pre-processing phase, comprising the step of allocating one or more groups of one or more tasks in the tasks graphs to one or more processing elements (PEs) in the resource library and allocating one or more edges in the tasks graphs to one or more communication links in the resource library, based on performance evaluation of one or more possible allocations for each of the groups and edges in light of the system/task constraints, wherein the performance evaluation is based on the hyperperiod with the hyperperiod spill.

11. An embedded system having an architecture generated using the method of claim 10.

12. A method for designing the architecture of an embedded system, comprising:
  (a) a pre-processing phase comprising the step of parsing one or more task graphs, one or more system/task constraints, and a resource library for the embedded system; and
  (b) a synthesis phase, following the pre-processing phase, comprising the steps of:
    (1) generating an allocation array for each group of one or more tasks in the tasks graphs and each edge between groups in the task graphs, wherein each allocation array comprises one or more different possible allocations for the groups and edges arranged based on a selected cost function; and
    (2) allocating each group to a processing element (PE) in the resource library and each edge to a communication link in the resource library, by evaluating performance of the one or more possible allocations in the corresponding allocation array in light of the system/task constraints.

13. The method of claim 12, wherein the allocations are ordered in the allocation array by dollar cost.

14. The method of claim 12, wherein the allocations are ordered in the allocation array by average power dissipation.

15. The method of claim 12, wherein the allocation array is generated using architectural hints that pre-store allocation templates corresponding to mappings of sub-task-groups to part of the architecture of the embedded system.

16. The method of claim 12, wherein each allocation step in the allocation array is limited to m new PEs and n new communication links of the same type, wherein m and n are specified thresholds.

17. The method of claim 16, wherein m and n are both two.

18. The method of claim 12, wherein, during allocation array generation, for each allocation, checks are made for signal compatibility and voltage translation buffers are added, as necessary.

19. The method of claim 12, wherein, during allocation array generation, allocations are excluded for which at least one of pin count, gate count, communication port count, memory limits, and peak power dissipation is exceeded.

20. An embedded system having an architecture generated using the method of claim 12.

21. A method for designing the architecture of an embedded system, comprising:
  (a) a pre-processing phase comprising the step of parsing one or more task graphs, one or more system/task constraints, and a resource library for the embedded system; and
  (b) a synthesis phase, following the pre-processing phase, comprising the steps of:
    (1) selecting possible allocations for each group of one or more tasks in the task graphs and each edge in the task graphs;
    (2) performing scheduling for each selected allocation, wherein the scheduling for at least one selected allocation uses a combination of preemptive and non-preemptive scheduling taking into account a preemption overhead corresponding to one or more types of operating system overheads associated with the selected allocation;
    (3) evaluating performance of each selected allocation based on results of the scheduling in light of the system/task constraints; and
    (4) allocating each group to a processing element (PE) in the resource library and each edge to a communication link in the resource library, based on results of the performance evaluation.

22. The method of claim 21, wherein the preemption overhead for the at least one selected allocation is specified a priori.

23. The method of claim 21, wherein preemption is restricted to the last task in a task graph.

24. The method of claim 21, wherein preemption of a higher priority task by a lower priority task is allowed only in the case when the higher priority task is a sink task that will not miss its deadline.

25. The method of claim 21, wherein the scheduling relies on deadline-based priority levels of tasks in allocated groups and edges that are allocated to inter-PE communication links.

26. The method of claim 21, wherein the scheduling takes into consideration any hyperperiod spill that results when execution of one or more different tasks exceed a hyperperiod of the embedded system.

27. The method of claim 21, wherein, during scheduling, a first copy of the task is scheduled and, when possible, start and finish times of any remaining copies of the task in a hyperperiod of the embedded system are updated to reduce scheduling complexity.

28. The method of claim 21, wherein tasks and edges are ordered for scheduling based on decreasing order of their priority levels.

29. The method of claim 28, wherein, if two tasks have equal priority levels, then the task with a shorter execution time is scheduled first.

30. The method of claim 28, wherein, if two edges have equal priority levels, then the edge with a shorter communication time is scheduled first.

31. The method of claim 21, wherein, when scheduling edges, a mode of communication supported by the corresponding communication link and PE is taken into account.

32. The method of claim 31, wherein the mode of communication is either sequential or concurrent.

33. The method of claim 21, wherein, when scheduling edges, the scheduling takes into account a corresponding type of communication link.

34. The method of claim 33, wherein the corresponding type of communication link is either point-to-point, multipoint, or local area network.

35. The method of claim 21, wherein finish time estimation is part of the performance evaluation of each allocation and the finish time estimation calculates the finish time of each task and edge using the longest path algorithm.

36. The method of claim 21, wherein, if the scheduling performances for all of the allocations for the selected cluster fail to meet the deadlines, an allocation is selected based on a cost function by which a summation of best-case finish times of all task graphs is maximum, wherein the best-case finish time of a task graph is a maximum of best-case finish times of constituent tasks with specified deadlines.

37. The method of claim 36, wherein, if there are more than one allocation which satisfy the cost function criteria, an allocation is chosen for which a summation of worst-case finish times of all task graphs is maximum.

38. An embedded system having an architecture generated using the method of claim 21.

* * * * *